US012639523B2

(12) United States Patent
Mercer, III et al.

(10) Patent No.: US 12,639,523 B2
(45) Date of Patent: May 26, 2026

(54) IMPLICITLY ASSOCIATING USER INTENTS TO AGENT SELECTED RESPONSES

(71) Applicant: Klaviyo, Inc., Boston, MA (US)

(72) Inventors: Robert Roosevelt Mercer, III, Raleigh, NC (US); Vera Guttenberger, Cambridge, MA (US); Casey Koppes, Hermosa Beach, CA (US); Gabriel Gralla, Somerville, MA (US); Kaila Corrington, Cambridge, MA (US); Nithin Gangadharan, Boston, MA (US); Prisca Sara Joseph, Canton, MA (US); Andrew Cole Young, Provincetown, MA (US); David Yi Xiao, Boston, MA (US); Smit Anish Kiri, Cambridge, MA (US); Tianxing Liu, Waltham, MA (US); Sanem Leblebici, Severna Park, MD (US)

(73) Assignee: Klaviyo, Inc., Boston, MA (US)

( * ) Notice: Subject to any disclaimer, the term of this patent is extended or adjusted under 35 U.S.C. 154(b) by 191 days.

(21) Appl. No.: 18/223,250

(22) Filed: Jul. 18, 2023

(65) Prior Publication Data

US 2023/0409841 A1      Dec. 21, 2023

Related U.S. Application Data

(63) Continuation-in-part of application No. 18/103,571, filed on Jan. 31, 2023, now Pat. No. 11,989,502.
(Continued)

(51) Int. Cl.
G06Q 30/02      (2023.01)
G06F 40/166      (2020.01)
G06F 40/35      (2020.01)
G06F 40/40      (2020.01)
G06F 3/0482      (2013.01)

(52) U.S. Cl.
CPC ............ *G06F 40/35* (2020.01); *G06F 40/166* (2020.01); *G06F 40/40* (2020.01); *G06Q 30/0281* (2013.01); *G06F 3/0482* (2013.01)

(58) Field of Classification Search
None
See application file for complete search history.

(56) References Cited

U.S. PATENT DOCUMENTS 6,917,965 B2    7/2005   Gupta et al.
6,937,705 B1 *   8/2005   Godfrey .............. H04M 3/2281
                                379/26.01
(Continued)

*Primary Examiner* — Irete F Ehichioya
*Assistant Examiner* — Samuel Shen
(74) *Attorney, Agent, or Firm* — Brian R. Short

(57) ABSTRACT

Apparatuses, methods, and systems for implicitly associating user intents to agent selected responses. One method includes receiving, by a server, a first input text message from a user, displaying, by the server, the first input text message to an agent, receiving, by the server, a first response to the first input text message from the agent, computing a first intent with the first input text message, prompting, by the server, the agent whether to associate the first response with the computed first intent of the first input text message, and recording the first response with the computed first intent of the first input message when the agent indicates an association between the first response with the computed first intent of the first input message.

19 Claims, 17 Drawing Sheets

Related U.S. Application Data

(60) Provisional application No. 63/391,712, filed on Jul. 23, 2022, provisional application No. 63/353,569, filed on Jun. 18, 2022.

(56)     References Cited

U.S. PATENT DOCUMENTS

| | | | |
|---|---|---|---|
| 7,162,690 | B2 | 1/2007 | Gupta et al. |
| 8,792,863 | B2 | 7/2014 | De Oliveira et al. |
| 9,378,511 | B2 * | 6/2016 | Chafle ................. G06Q 30/0205 |
| 9,659,224 | B1 | 5/2017 | Cole et al. |
| 10,484,542 | B1 | 11/2019 | Rager |
| 11,178,089 | B1 * | 11/2021 | Voss ......................... H04L 51/42 |
| 2005/0105712 | A1 * | 5/2005 | Williams .............. G10L 13/027 |
| | | | 704/275 |
| 2006/0080107 | A1 * | 4/2006 | Hill ..................... G10L 15/1822 |
| | | | 704/275 |
| 2012/0016661 | A1 | 1/2012 | Pinkas |
| 2012/0084634 | A1 | 4/2012 | Wong et al. |
| 2012/0240224 | A1 | 9/2012 | Payne et al. |
| 2013/0339001 | A1 * | 12/2013 | Craswell ................. G06F 40/30 |
| | | | 704/9 |
| 2014/0223284 | A1 | 8/2014 | Ranklin, Jr. et al. |
| 2015/0033114 | A1 * | 1/2015 | Lynch ................... G06F 40/151 |
| | | | 715/234 |
| 2016/0285816 | A1 | 9/2016 | Schmid et al. |
| 2018/0165723 | A1 | 6/2018 | Wright et al. |
| 2019/0146647 | A1 * | 5/2019 | Ramchandran ......... G06F 40/35 |
| | | | 715/758 |
| 2020/0387157 | A1 * | 12/2020 | Bosma ................. G05D 1/0231 |
| 2021/0073199 | A1 | 3/2021 | Bettaglio et al. |
| 2021/0256534 | A1 * | 8/2021 | An ......................... G06F 16/285 |
| 2021/0319478 | A1 * | 10/2021 | Dejardins ............. G06T 19/006 |
| 2021/0329124 | A1 * | 10/2021 | Li ..................... G06Q 10/06398 |
| 2022/0122141 | A1 * | 4/2022 | Bhardwaj .......... G09B 19/0038 |
| 2022/0337537 | A1 | 10/2022 | Lewis et al. |
| 2022/0350825 | A1 * | 11/2022 | van de Nieuwegiessen ................ G06F 40/35 |
| 2022/0374956 | A1 | 11/2022 | Jungmeisteris et al. |
| 2023/0105806 | A1 * | 4/2023 | Dunn ....................... G06N 3/08 |
| | | | 704/9 |
| 2023/0117535 | A1 * | 4/2023 | Apsingekar ............. G10L 15/22 |
| | | | 704/232 |
| 2023/0267479 | A1 | 8/2023 | Jacobson et al. |
| 2024/0242022 | A1 * | 7/2024 | Yee ......................... G06F 40/35 |
| 2024/0281597 | A1 | 8/2024 | Xiao et al. |

* cited by examiner

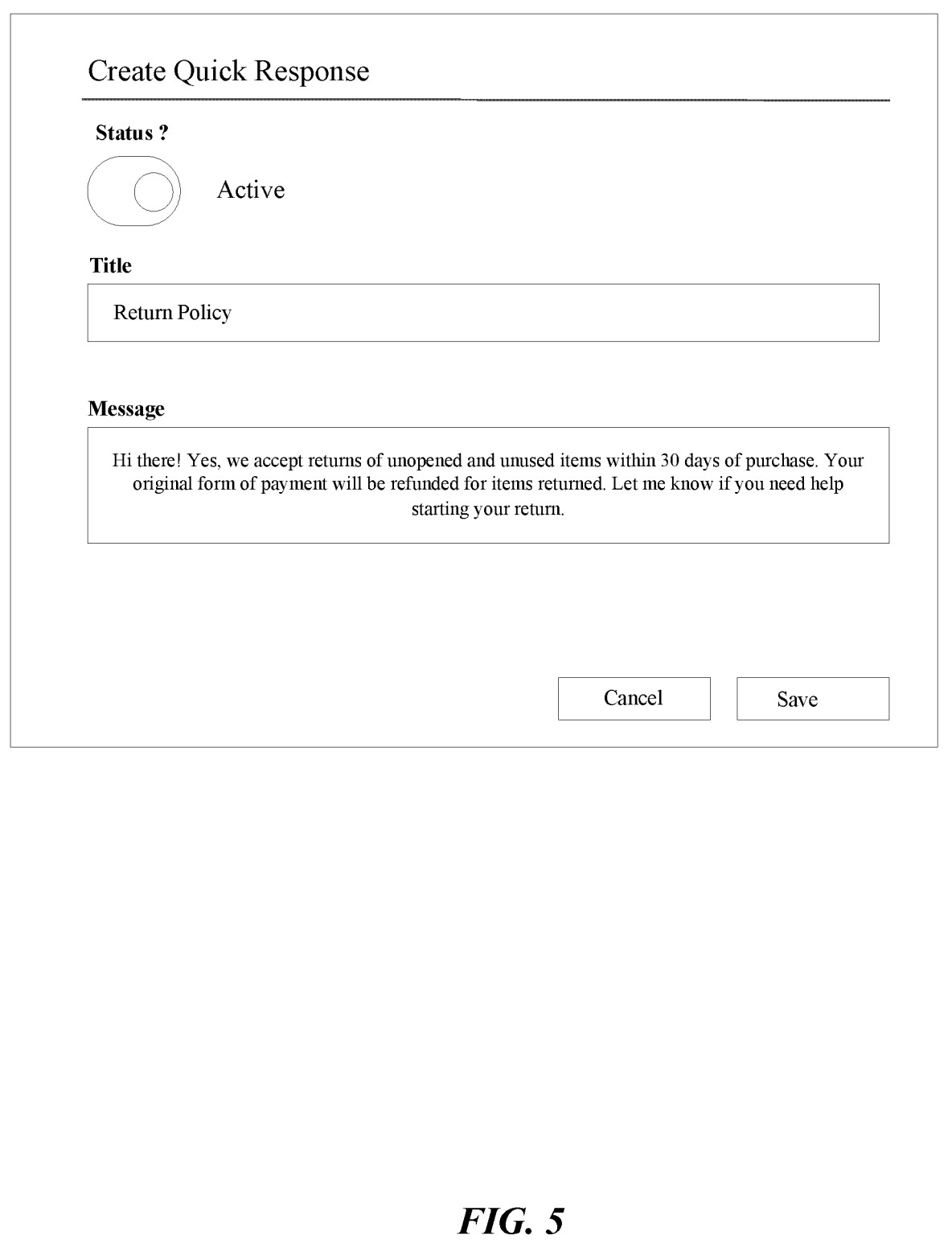

Create Quick Response

Status ?

◯    Active

Title

Return Policy

Message

Hi there! Yes, we accept returns of unopened and unused items within 30 days of purchase. Your original form of payment will be refunded for items returned. Let me know if you need help starting your return.

| Cancel | Save |

FIG. 5

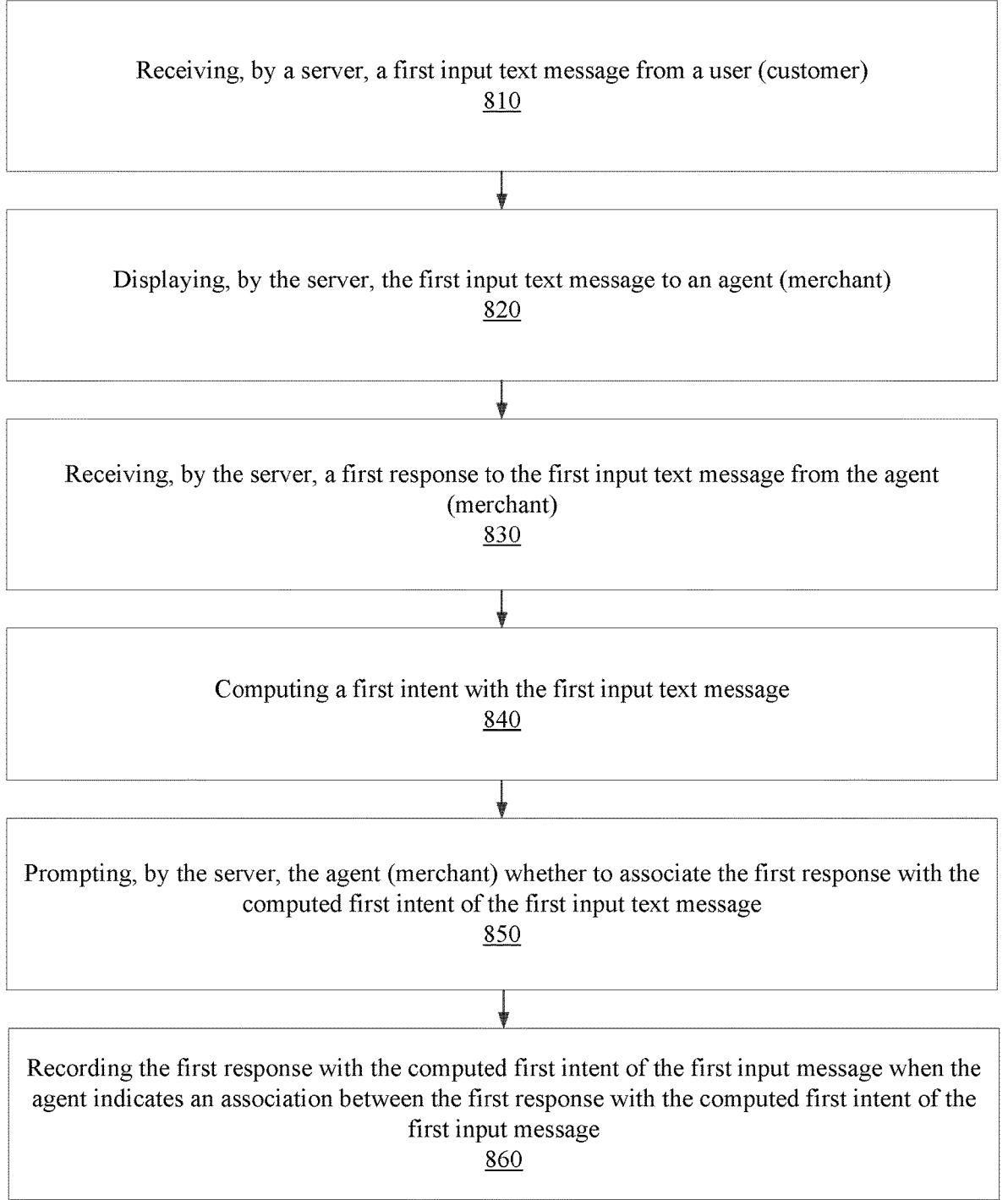

Receiving, by a server, a first input text message from a user (customer)
810

Displaying, by the server, the first input text message to an agent (merchant)
820

Receiving, by the server, a first response to the first input text message from the agent (merchant)
830

Computing a first intent with the first input text message
840

Prompting, by the server, the agent (merchant) whether to associate the first response with the computed first intent of the first input text message
850

Recording the first response with the computed first intent of the first input message when the agent indicates an association between the first response with the computed first intent of the first input message
860

*FIG. 8*

SMS Conversation Quick Responses

Create custom templates for messages that are sent frequently

Search Quick Responses  🔍    Filter by Catagory ▼

| Title | Message | Catagory | Status |
|-------|---------|----------|--------|
| Checkout help | Sure I can help with checkout. Could you tell me more about the issue please? | Checkout | Active |
| Coupon Issues | I'm happy to help you with your coupon | Coupon | Inactive |
| Coupon Request | Let me check if we have any available coupons | Coupon | Inactive |
| Free Shipping | Here is our shipping policy | Shipping | Inactive |
| Greatings | Hi there! | General | Inactive |
| Help | I am happy to help | General | Inactive |

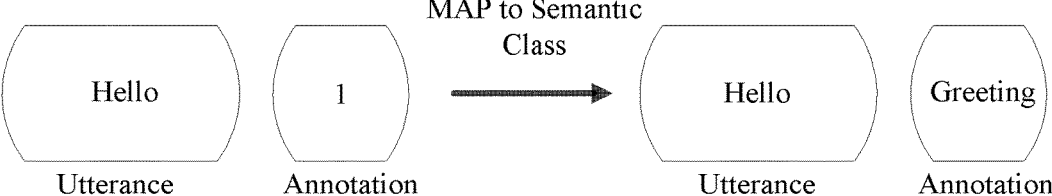

MAP to Semantic Class

Hello — Utterance    1 — Annotation    →    Hello — Utterance    Greeting — Annotation

*FIG. 12*

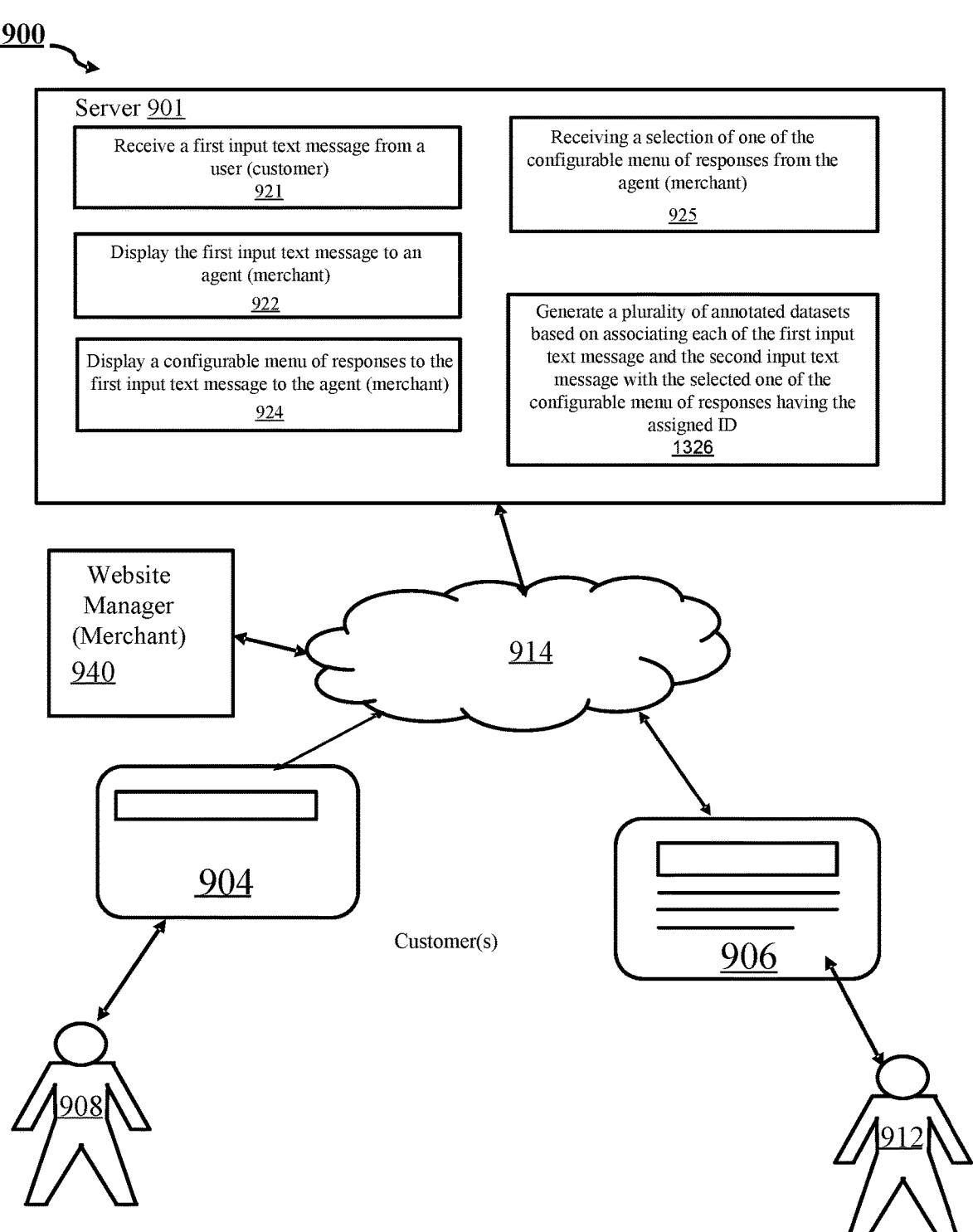

900

Server 901

Receive a first input text message from a user (customer)
921

Display the first input text message to an agent (merchant)
922

Display a configurable menu of responses to the first input text message to the agent (merchant)
924

Receiving a selection of one of the configurable menu of responses from the agent (merchant)
925

Generate a plurality of annotated datasets based on associating each of the first input text message and the second input text message with the selected one of the configurable menu of responses having the assigned ID
1326

Website Manager (Merchant)
940

914

904

906

Customer(s)

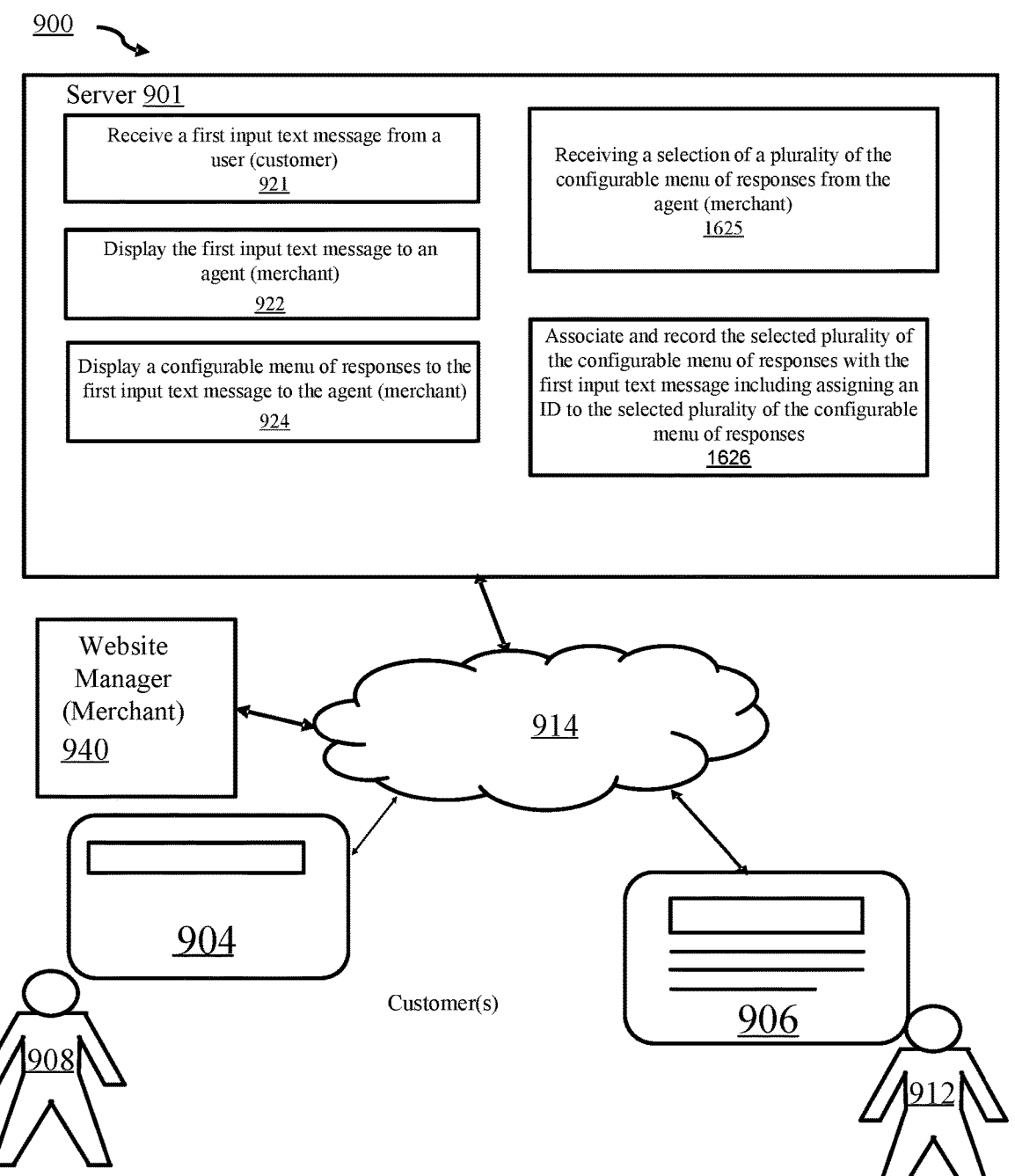

900

Server 901

Receive a first input text message from a user (customer)
921

Display the first input text message to an agent (merchant)
922

Display a configurable menu of responses to the first input text message to the agent (merchant)
924

Receiving a selection of a plurality of the configurable menu of responses from the agent (merchant)
1625

Associate and record the selected plurality of the configurable menu of responses with the first input text message including assigning an ID to the selected plurality of the configurable menu of responses
1626

Website Manager (Merchant)
940

914

904

906

Customer(s)

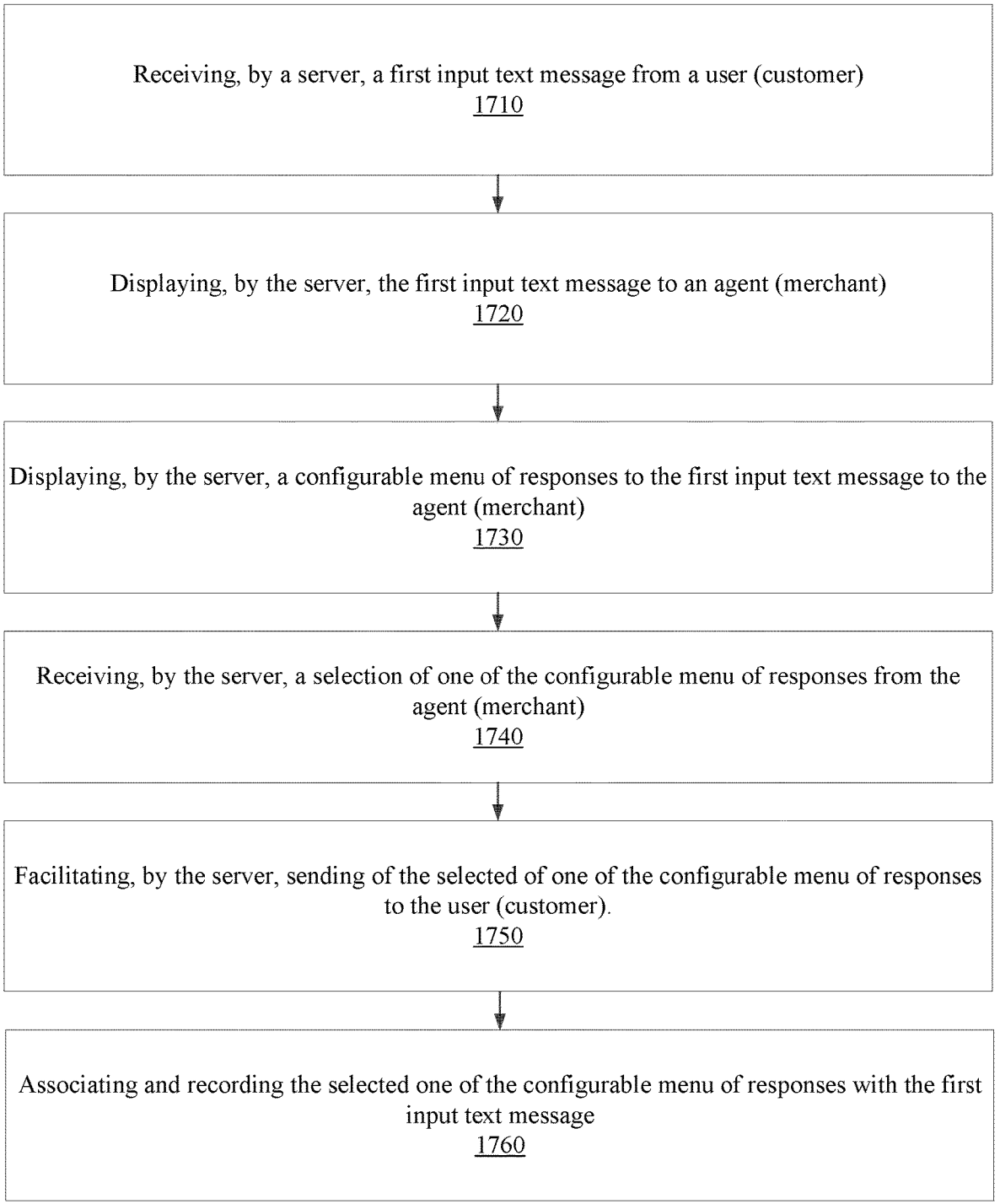

Receiving, by a server, a first input text message from a user (customer)
1710

Displaying, by the server, the first input text message to an agent (merchant)
1720

Displaying, by the server, a configurable menu of responses to the first input text message to the agent (merchant)
1730

Receiving, by the server, a selection of one of the configurable menu of responses from the agent (merchant)
1740

Facilitating, by the server, sending of the selected of one of the configurable menu of responses to the user (customer).
1750

Associating and recording the selected one of the configurable menu of responses with the first input text message
1760

*FIG. 17*

IMPLICITLY ASSOCIATING USER INTENTS TO AGENT SELECTED RESPONSES

RELATED PATENT APPLICATIONS

This patent application claims priority to Provisional Patent Application Ser. No. 63/391,712 filed Jul. 23, 2022 and is a continuation-in-part (CIP) of U.S. patent application Ser. No. 18/103,571 filed Jan. 31, 2023, which claims priority to Provisional Patent Application Ser. No. 63/353, 569 filed Jun. 16, 2022, which are all herein incorporated by reference.

FIELD OF THE DESCRIBED EMBODIMENTS

The described embodiments relate generally to intelligent electronic interactions. More particularly, the described embodiments relate to systems, methods, and apparatuses for implicitly associating user intents to agent selected responses.

BACKGROUND

Supervised classification task models are trained using examples consisting of utterances (strings of text in a natural language such as English), and a label which classifies the utterance into one of several classes (commonly called intents in the literature). For example, the classification may be as simple as "Positive", "Negative", and "Neutral", and one wishes to classify individual utterances based on the sentiment therein. "Yay that's great" may be classified as "Positive" while "Terrible, just terrible" may be classified as "Negative". This is one simple example, and in general the classification ontology may be arbitrarily complex, with tens, hundreds, or more possible classes.

Using machine learning techniques, models can be trained that are able to successfully classify natural language utterances by feeding the machine learning algorithm with large data sets of utterance/label pairs. The machine learning algorithm then constructs models that are able to classify new, unseen examples with high accuracy. The accuracy of these algorithms improves as the amount of data fed to them grows, and so one of the main challenges in machine learning is to gather and maintain a large corpora of data.

Annotating utterances can be extremely costly since it requires a person to manually read and apply their judgment to produce a label. In this application we disclose a method to take advantage of a person using software they would be using anyway in order to annotate utterances, thereby providing a free source of annotated natural language data.

It is desirable to have methods, apparatuses, and systems for implicitly associating user intents to agent selected responses.

SUMMARY

An embodiment includes a computer-implemented method of implicitly associating user intents to agent selected responses. The method includes receiving, by a server, a first input text message from a user, displaying, by the server, the first input text message to an agent, receiving, by the server, a first response to the first input text message from the agent, computing a first intent with the first input text message, prompting, by the server, the agent whether to associate the first response with the computed first intent of the first input text message, and recording the first response with the computed first intent of the first input message when the agent indicates an association between the first response with the computed first intent of the first input message.

Another embodiment includes a system for implicitly associating user intents to agent selected responses. The system includes a merchant server configured to operate and manage a website, a plurality of customer devices configured to provide input text messages, and a server electronically connected to the merchant server and the plurality of customer devices. For an embodiment, the server is configured to receive a first input text message from a user, display the first input text message to an agent, receive a first response to the first input text message from the agent, compute a first intent with the first input text message, prompt the agent whether to associate the first response with the computed first intent of the first input text message, and record the first response with the computed first intent of the first input message when the agent indicates an association between the first response with the computed first intent of the first input message.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 shows a "quick response" editing dialogue with content pre-filled based on the classified intent and a message of an agent, according to an embodiment.

FIG. 8 is a flow chart that includes steps of a method of implicitly associating user intents to agent selected responses, according to an embodiment.

FIG. 12 shows a display that includes multiple responses for prompting the merchant, and further includes mapping opaque IDs to a semantic class, according to an embodiment.

FIG. 13 shows a system for implicitly annotating textual data in conversational messaging, according to an embodiment.

FIG. 16 shows a system for implicitly annotating textual data in conversational messaging wherein sequences or combinations of responses are associated and recorded for an input text message, according to an embodiment.

FIG. 17 is a flow chart that includes steps of a method of implicitly annotating textual data in conversational messaging, according to an embodiment.

DETAILED DESCRIPTION

Figure 1:
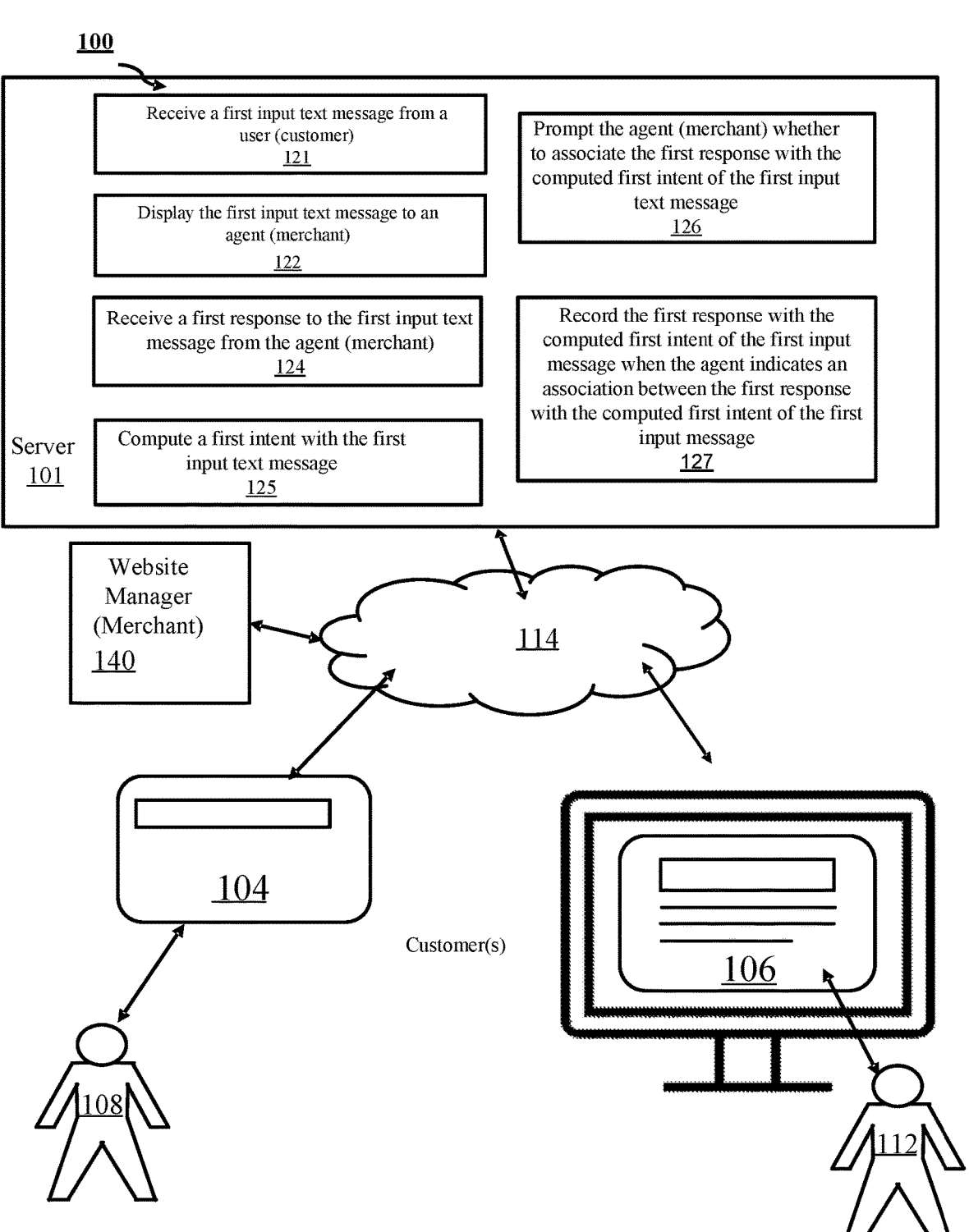
FIG. 1 shows a system for implicitly associating user intents to agent selected responses, according to an embodiment.

Companies responding to help desk messages are frequently presented with the same or similar messages received from users (customers) of the company (merchants). One way to reduce the burden and cost of supporting such messages is to provide help desk agents with pre-written responses to those common messages. The described embodiments provide methods of implicitly linking common messages to the correct response. That is, the described embodiments are integrated into the practical application of linking intents of received messages with selectable or automatic responses. Further, at least some of the described embodiments are integrated into the practical application of monitoring actions of users (customers) in response to receiving the selectable or automatic responses which are used to rank a quality of the selectable or automatic responses to the received input messages. The quality or ranking of the quality of the responses can be used to determine whether to continue with automatic response generation or agent selectable response generation.

Responding to help desk messages is time consuming and costly. Responding to the messages requires a person, the help desk agent, to manually read each message, consider a response, and then compose a message to respond back to the customer. This time can be cut down if common questions are identified (for example, "Can I have a refund?", "Do you have a website?", "Where is your shop located?") and pre-written responses are collected for these. At least some of the described embodiments improve the technical problem of responding by an agent to help desk messages by identifying an intent or category for each message received from a user (customer) and linking the intent or category for each one of these messages to a response (which may be generated by the agent or which may be a pre-written response). For example, if the inbound message of "Can I have a refund" is presented, then an intent/category of "can get refund" is identified. When a later inbound message is identified as having the same intent, then the response linked to the identified intent can be retrieved for selection by the agent. Another example: "Where is your shop located?" might have the intent/category of "address" associated with it. Then, if these intents/categories are linked with a pre-written response and the pre-written response is displayed a clickable suggestion to new messages with the linked intent/category, a system is provided where a help desk agent can simply respond to queries without having to search the list of pre-written responses.

Table 1 provides examples of samples inbound messages (received input text messages), samples of intents/categories, and samples of responses to the inbound messages that can be associated with the intents.

TABLE 1

| Sample Inbound Message | Sample Intent or Category | Sample Pre-written Response |
|---|---|---|
| Where is your shop located? | address | 125 Summer St., Boston, MA 02111 |
| Can I have a refund? | can get refund | We offer refunds starting within 30 days of the original purchase data. Visit XXX.com/returns to get started |

For an embodiment, an intent can be thought of as a common category of a message. For example, "I'm having trouble with my order" and "I can't seem to find the purchase button" might have an intent of "order trouble". For an embodiment, the intent can be algorithmically generated, but for the described embodiments, the intent can be generated in other ways as well. For an embodiment, the input text message is input to a natural language processor which generates intents of the input text message.

FIG. 1 shows a system 100 for implicitly associating user (customer) intents to agent (merchant) selected responses, according to an embodiment. The system 100 includes a server 101. For an embodiment, the server 101 is electronically connected through a network 114 to a merchant server 140 of a merchant (agent), and electronic devices 104, 106 of site visitors (users or customers of the merchant) 108, 112.

At least some of the described embodiments provide annotation generation for conversational data in 2-way messaging systems. Some exemplary 2-way messaging systems include SMS (Short Message Service), WhatsApp WeChat Facebook Messenger®, and similar platforms that enable 2-way textual communication. At least some of the described embodiments benefit operators of the server 101 by providing the 2-way messaging system and permitting the operator to collect annotations for utterances received through the system.

At least some of the described embodiments treat the two sides (for example, agent (merchant) and user (customer)) of the messaging conversation asymmetrically. For descriptive purposes, the two parties to the conversation may be referred to as Alice and Bob. Suppose Company C operates the server 101 that Alice (for example, a merchant) is using to communicate with Bob (for example, a customer of the merchant A) via 2-way messaging. For an embodiment, Bob (customer) may also be using a service of company C. At least some of the described embodiments enable Company C to use Alice's interactions with Bob's to collect annotations of Bob's messages. For at least some embodiments, the server 101 provides a way for Alice (merchant) to store and then select responses. For an embodiment, the responses are pre-written. For an embodiment, the responses are electronically generated.

For an embodiment, a merchant server 140 operates and manages an ecommerce website of the merchant. For an embodiment, the merchant server 140 includes a server of a business (the merchant) that operates to directly control the ecommerce website. For an embodiment, the merchant server 140 includes a combination of the business (merchant) and a third party to operate to control the ecommerce website. For an embodiment, the merchant of the merchant server 140 is a customer of the operator of the server 101. For an embodiment, the merchant server 140 is a combination of the customer of the operator of the server 101 and a third party (such as a Shopify© platform). For an embodiment, the merchant server includes one or more third party servers.

For an embodiment, the server 101 operates to receive 121 a first input text message from a user (customer), display 122 the first input text message to an agent (merchant), receive 124 a first response to the first input text message from the agent (merchant), compute 125 a first intent with the first input text message, prompt 126 the agent (merchant) whether to associate the first response with the computed first intent of the first input text message, and record 127 the first response with the computed first intent of the first input message when the agent indicates an association between the first response with the computed first intent of the first input message.

Computing an Intent

For an embodiment, the first computed intent is computed by entering the first input text message into a trained language model. The trained language model generates an intent based on the input first input text message, which for the first time that the first input text message is entered is the first intent. Later, new input text messages are input to the trained language model. If the intent of the new input text message(s) is the previously computed first intent, then the association with the response is determined from the previous recording of the computed first intent with the first response. For example, a computed intent for "The shirt was the damaged when it arrived, can I have a refund please" may include a language model determining that intent based on various aspects of the input text message, for example, the words "damaged" and "refund" appear without any positive words, etc.

Associating a Response with an Intent

As described, for an embodiment, the agent is prompted as to whether to associate the computed intent with the response. If the agent affirms the association, then the response is associated with the first intent. For an embodiment, other future input text messages that are associated with the first intent receive the response back in response to the future input text messages. Alternatively, the response may be suggested to the agent for the future input text message as, for example, as a part of a configurable menu of responses from the agent (merchant). The agent can then select the response for the future input text messages. For an embodiment, the selection is from a suggested list of responses that includes the response, and other possible responses, such as, responses that have been provided in the past. For an embodiment, the other possible responses include the most frequently provided responses. That is, the responses that have been provided the most in the past or the responses that have been provided as a higher ratio of the response provided. For an embodiment the other responses include the most recently provided responses. That is, the last number X of responses.

Receiving Response to Input Text Message from Agent

As described, the agent provides a response to the input text message. For an embodiment, the agent can generate the response by directly entering the response. However, an embodiment includes displaying, by the server, a configurable menu of responses to the first input text message to the agent (merchant), and receiving, by the server, the first response as a selection of one of the configurable menu of responses from the agent (merchant). Once the response has been generated or selected by the agent, for an embodiment, the server facilitates sending of the first response to the user (customer) in response to the first input text message.

For at least some embodiments, the server 101 further operates to receive a second input text message from one or more users (customers). For an embodiment, the first intent is computed for the second message as well. Therefore, in this situation, the first intent is computed for both the first input text message and the second input text message. Accordingly, the server 101 can identify the first response for the second input message based on the recorded association between the first response and the computed first intent. For an embodiment, the first response is suggested to the agent (merchant) as a proposed response to the second input text message because of the computed first intent for the second input text message. For an embodiment, this includes displaying a configurable menu of responses to the second input text message to the agent (merchant), wherein the configurable menu of responses includes at least the first response. The configurable menu of response may include the first response, and other possible responses. For an embodiment, the other possible response may include related responses or responses that have been most frequently used in the past. That is, selected responses are tracked, and the responses that were most commonly selected as responses in the past are provided for future input text messages, such as, the second input text message. For an embodiment, variations of the first response may be additionally provided to the agent for possible selection.

For an embodiment, the server 101 receives the first response as a selection of one of the configurable menu of responses from the agent (merchant). Once the first response (or any other response) has been selected by the agent (merchant), the server operates to facilitate sending of the first response to the user (customer) in response to the second input text message.

Automated Response

For an embodiment, the server 101 receives a second input text message from one or more users (customers), and the first intent is computed with the second input text message. As previously described, a language model may be used for computing the intent, such as, the first intent. Accordingly, because the first intent has been associated with the first response, for an embodiment, the first response is identified for the second input message based on the recorded association between the response and the computed first intent. However, for an automated response, the server 101 directly facilitates sending of the first response to the user (customer) in response to the second input text message without confirmation by the agent (merchant). That is, at some point the system may become fully automated as the quality of the generated responses gets better and better. For an embodiment, the quality of the response is monitored, and this monitoring can be used to evaluate response selection by the agent (merchant). Further, the quality monitoring of the responses can be used to determine when to fully automate and directly provide responses without the agent making a selection.

For an embodiment, the response generation is dependent on the intent computation. For an embodiment, when a computed intent is exactly the same as a previously determined intent, then the response can be automatically generated because the exact intent previously had a response generated for it. For example, if a second input message has an intent computed that is exactly the same as the first intent, then the first response that was recorded with the first computed intent can be automatically selected. However, if the second input message has an intent computed that is within a first threshold of the computed first intent, then the agent is displayed the response and other associated responses. However, if the second input message has an intent computed that is greater than a second threshold of the first intent, then the agent is prompted for a new response.

For an embodiment, cosine similarity scores are computed between intents using established vectorization methods. Namely, for an embodiment, the intents are embedded as vectors, and the projection of the two vectors on one another quantifies the syntactic similarities between the two intents. For an embodiment, when intent pairs are determined to have high similarity scores (greater than a similarity threshold) then the later computed intent is determined to be the same as the previously determined intent. For an embodiment, the threshold is determined experimentally to determine what threshold of similarity works well.

For an embodiment, the cosine similarity process includes taking two text strings and embedding them as vectors, meaning that the words of the text string are translated into a mathematical object that includes numbers that can be crunched (processed). For example, the intent "order trouble" may be embedded as [1, 1, 1, 1, 0, 0] and the intent "refund" may be embedded as [1, 1, 1, 0, 1, 1]. The "cosine similarity" between these two vectors is the "distance" spanned by these two vectors, the shorter this distance, the more similar are the strings. For an embodiment, the cosine similarity threshold is selected to be ~0.8, meaning if the cosine similarity calculated is >0.8 ish (or another selected threshold), the strings are similar and the later computed intent is determined to be the same as the earlier computed intent.

Estimating Quality of Responses

Once a response has been sent in response to an input text message, it is desirable to monitor the quality of the response. Accordingly, the response selection process can be adaptively updated to maintain a quality of the response generated or selected in response to input text messages. In order to monitor the quality of the responses, an embodiment further includes monitoring actions of the user (customer) in response to receiving the first response. For an embodiment, this includes evaluating or estimating a level of quality of the first response based on the monitored actions of the user (customer). For an embodiment, evaluating the quality includes determining whether the monitored actions of the user (customer) include the user (customer) purchasing a product or service of the agent (merchant) as a result of having received the first response. That is, if the user (customer) proceeds to purchase a product or service of the agent (merchant) after receiving the response from the agent (merchant), then it can be assumed that the response was effective and of high quality. An embodiment includes ranking the first response based on the monitored actions of the user (customer). For an embodiment, if the quality of the responses is determined by the user actions to be greater than a predetermined rank and predetermined amount of time, the previously automated response generation may be selected and maintained. However, if the quality of the responses falls below a selected threshold or rankings, then the agent may be prompted for aid in the generation of the responses. Further, for an embodiment, the merchant is provided with the quality of the responses in order that the merchant can monitor the quality of the response selection by the agents of the merchant.

Monitoring of User (Customer) Actions

For an embodiment, the monitored customer actions are used to evaluate the quality of the responses provided to the user (customer). For an embodiment, this includes determining action taken by the user (customer) as a result of receiving the response. That is, the user taking a desired action as a result of having received the response provides for a determination of the quality of the response. For an embodiment, an application is loaded onto each of the computing devices of the users. For an embodiment, the user receiving a response to an input text message triggers the application to monitor actions of the user when the user receives the response. Due to time proximity between the receipt of the response and the actions of the user, the actions of the user may be correlated with the receipt of the response. For an embodiment, the monitored actions include online action performed by the user upon receiving the response. As previously described, the monitored actions can be used to evaluate and possibly rank the quality of the response. For an embodiment, the response provided to the user (customer) in response to the input text message of the user (customer) can include an indicator that the application loaded onto the computing device of the user recognizes as a quality monitoring indicator that indicates to the application to monitor actions of the user in response (triggered) by the user receiving the response. As stated, the monitored actions of the user are used to determine the quality of the response.

For an embodiment, the computing device of a user includes a mobile device. Accordingly, the application loaded on the computing device can be triggered upon receiving the response to then monitor physical actions of the user along with the online actions of the user. For an embodiment, the response includes an indicator that the application identifies as an indication to start monitoring actions of the user. For an embodiment, the sensed actions include the mobile message recipient(s) carrying out a main action that a response is intended to elicit, such as, for example, clicking a link in the response (potentially embedded in an image), or making a purchase on the website linked to in the response. Further, users receive the responses via mobile computing devices, such as, a cellular phone. Accordingly, physical actions of the users can be tracked by the application to determine whether the user(s) carried out a main action that a response is intended to elicit. That is, sensors, such as, location sensors, such as, GPS (global positioning system) sensors, and/or motion sensors (such as, accelerometers, gyroscopes, and/or magnetic sensors) can be used to track the locations and actions of the user(s) to determine whether user(s) performed the main action or another action. Sensed action can include, for example, sensing that the user(s) deviated in behavior (sensed motion) or location. The sensed behavior or sensed location can be used, for example, to determine that the user(s) visited a physical location of the merchant of the marketing manager server 140. Further, actions of the users(s) can be sensed by detecting motions of the user(s) that indicated that the user(s) perused the physical location of the agent and picked up and physically looked at a product. Further, actions of user(s) can be sensed to determine that different user(s) interacted and caused behavior changes between the user(s) and potentially others. The sensed location and actions of user(s) can be used to establish relationships between different users. Once relationships are established, interactions between different of the related users can be sensed and determined to be caused by reception of a response. Such interactions can be determined to be a main action that a response is intended to elicit. Further, combinations or patterns of the actions of the users may be monitored and identified by the application on the user computing device. The quality of the response can be influenced by identifying selected combinations, sequences, or patterns of a series of sensed actions. That is, certain sequences of actions by the user can provide a reflection of the quality of the response.

Exemplary Agent User Interface Display

Figure 2:
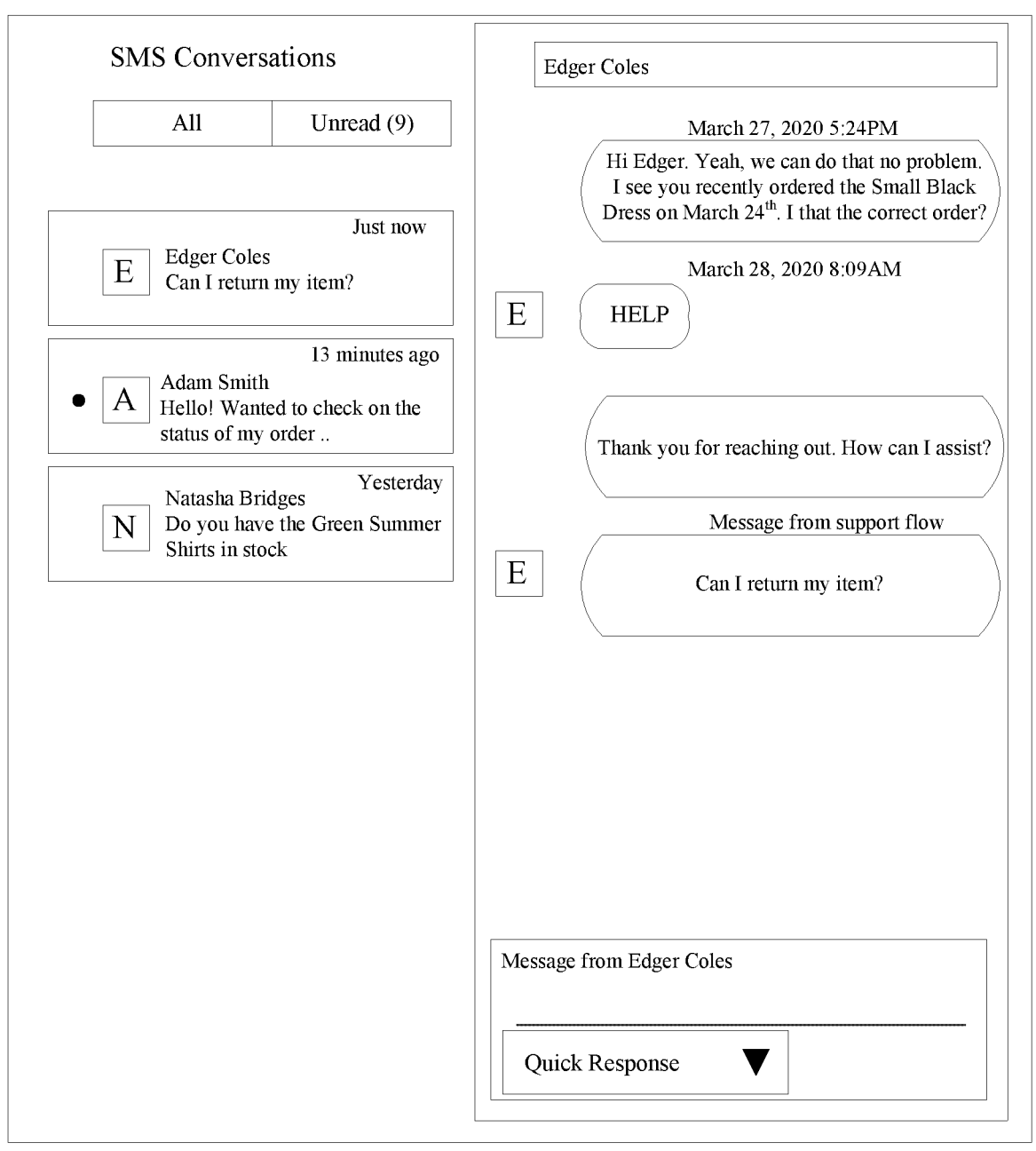
FIG. 2 shows a display of an inbound message from a user, according to an embodiment.

FIG. 2 shows a display of an inbound message from a customer Edgar, according to an embodiment. The display is provided to an agent (merchant) that may be referred to as "Alice". As shown, for an embodiment, Alice receives an inbound message from a customer (who may be referred to as Edgar). For an embodiment, that message is assigned (computed) an intent based on the content of the message (for example, by making a call to a separate service responsible for assigning intents). For an embodiment, this intent is assigned a unique ID. For the example shown in FIG. 2, the inbound message (input text message) from Edgar of "Can I return my item?" may be given an intent ID of "return policy".

Figure 3:
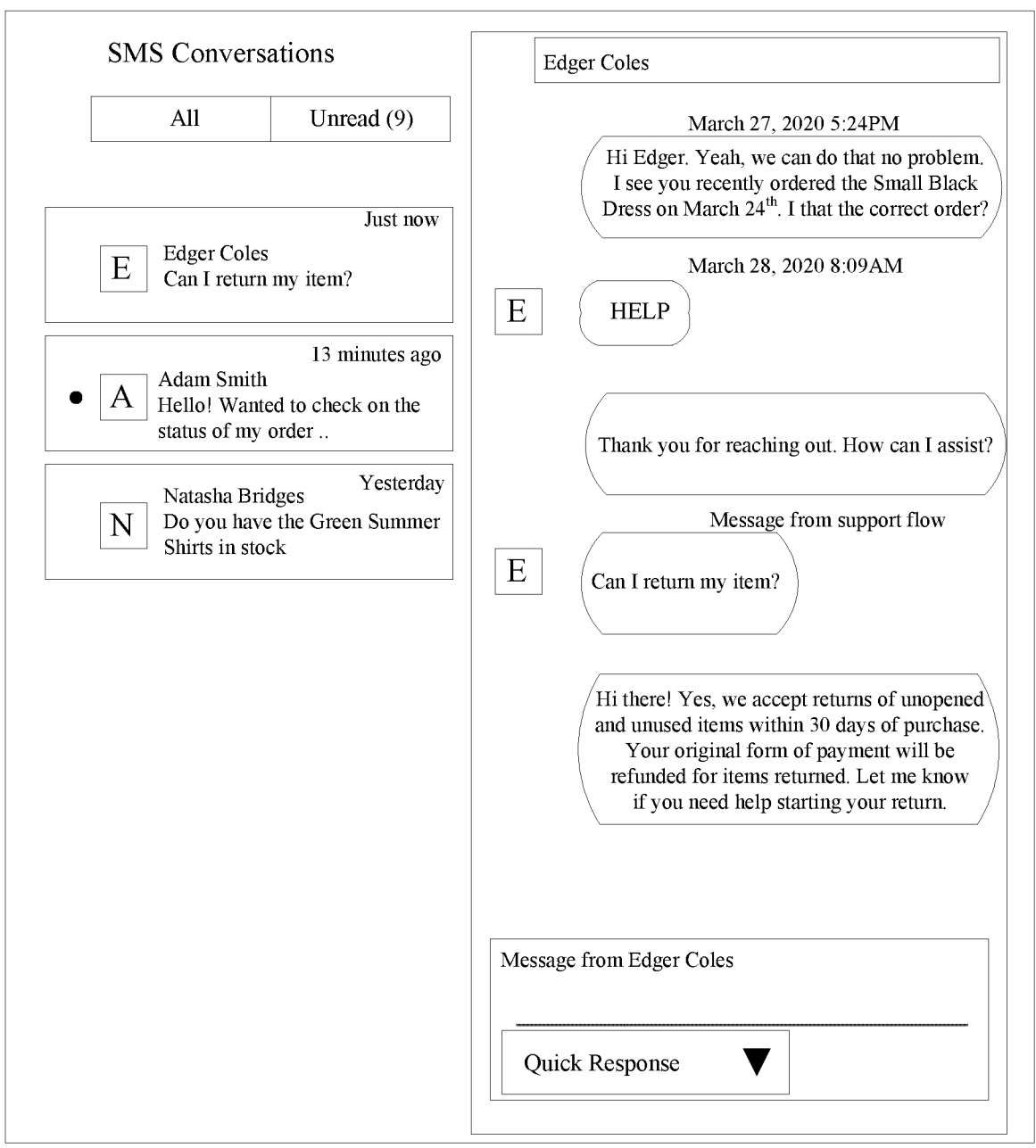
FIG. 3 shows a display of an agent response with a message of a return policy, according to an embodiment.

FIG. 3 shows a display of an agent (Alice) response with a message of a return policy, according to an embodiment. For an embodiment, Alice (agent) may respond with a message telling Edgar the return policy: "Hi there! Yes, we accept returns of unopened and unused items within 30 days of purchase. Your original form of payment will be refunded for items returned. Let me know if you need help starting your return."

Figure 4:
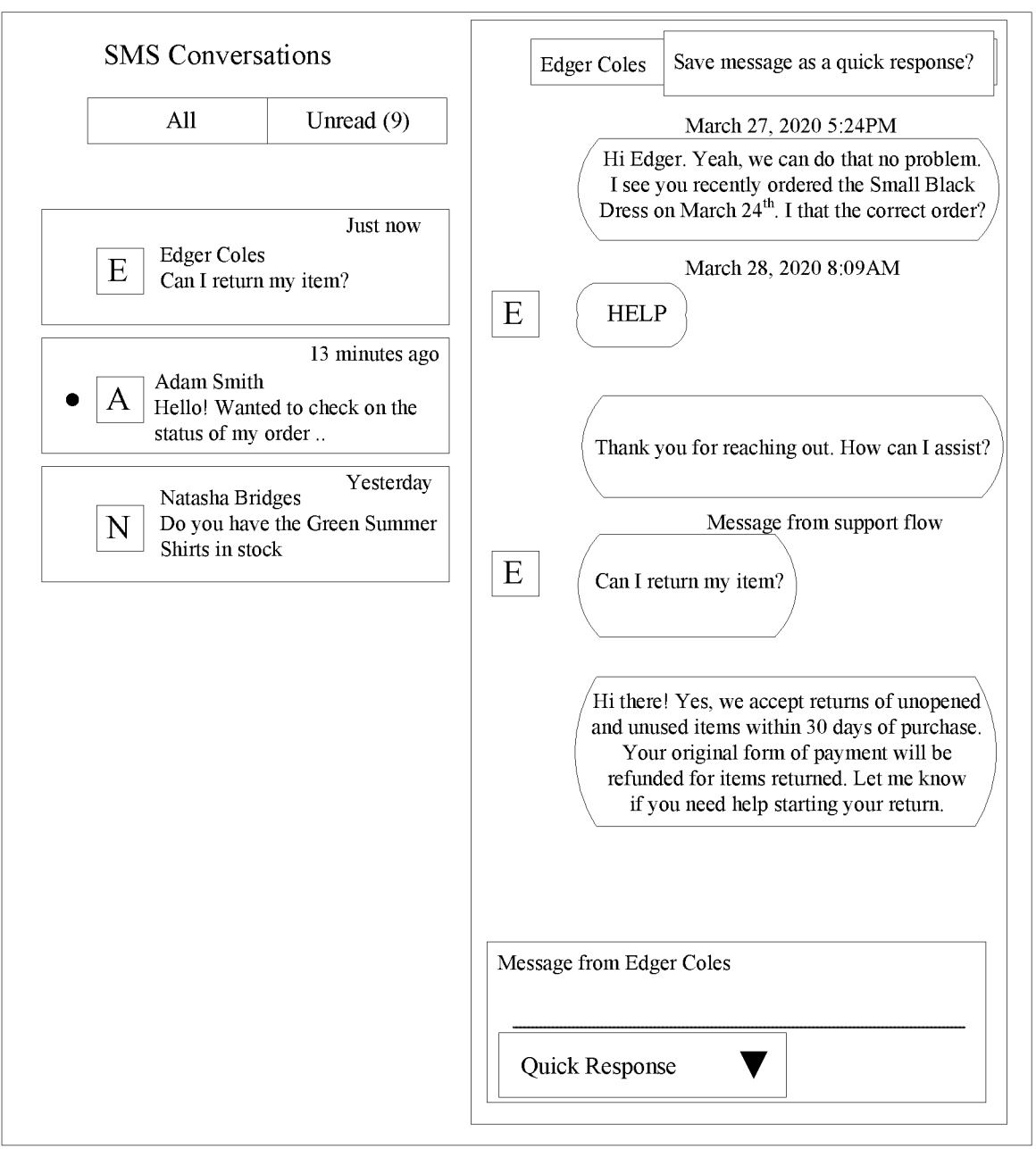
FIG. 4 shows a display that includes the linking of an inbound message with an intent of a pre-written response, according to an embodiment.

FIG. 4 shows a display that includes the linking of an inbound message with an intent of a pre-written response, according to an embodiment. At least some of the described embodiments include detecting that the help desk agent reply was sent in response to an inbound message with an intent and thus opens a prompt asking the agent if the agent (Alice) would like to associate that intent with a pre-written message in the context of the conversation. An embodiment includes a notification appearing prompting Alice (merchant) to save the message as a "quick response" (another term for a response or pre-written responses). For an embodiment, the message input by the user is then associated with the identified intent.

FIG. 5 shows a "quick response" editing dialogue with content pre-filled based on the classified intent and a message of an agent (Alice (merchant)), according to an embodiment. For an embodiment, when clicking "Save", Alice is then prompted with a "quick response" edit dialog (FIG. 5). The dialog in this case is pre-populated with the message title (the intent display name), the message content (the message the agent just sent), and the category (the intent category).

Figure 6:
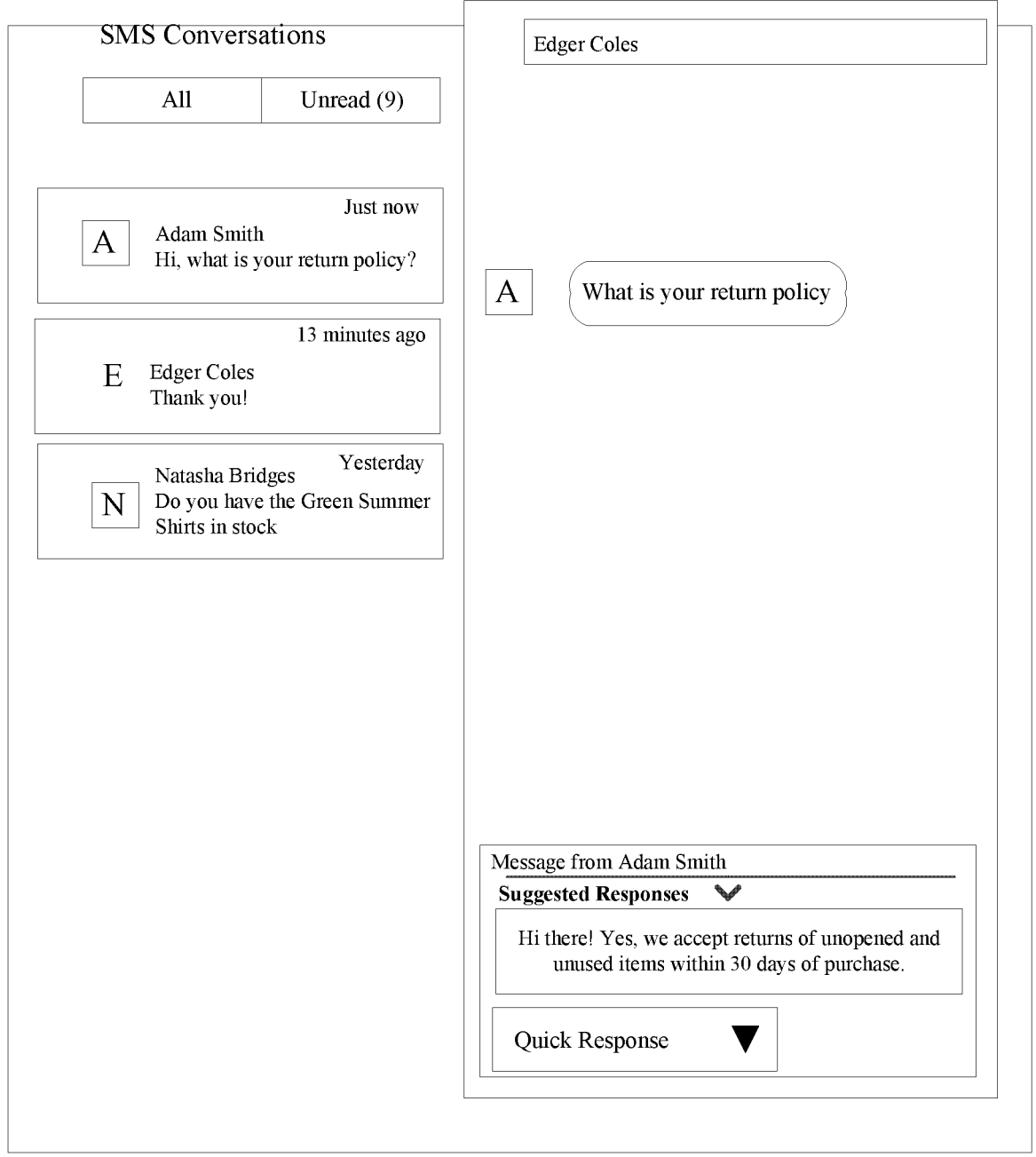
FIG. 6 shows a saved response associated with a return policy that appears as a suggestion whenever any customer about a return policy is identified, according to an embodiment.

FIG. 6 shows a saved response associated with a return policy that appears as a suggestion whenever any customer about a return policy is identified, according to an embodiment. After Alice saves the associate of the linking between the input message and the intent and the linking between the intent and the response. Later on when another message comes in associated with the checkout intent, Alice will see her saved response as a suggestion. For an embodiment, after the intent has been associated with the pre-written response, every time in the future that this intent is detected, the help desk agent will be prompted with that pre-written response as an option to respond back to the user with.

Figure 7:
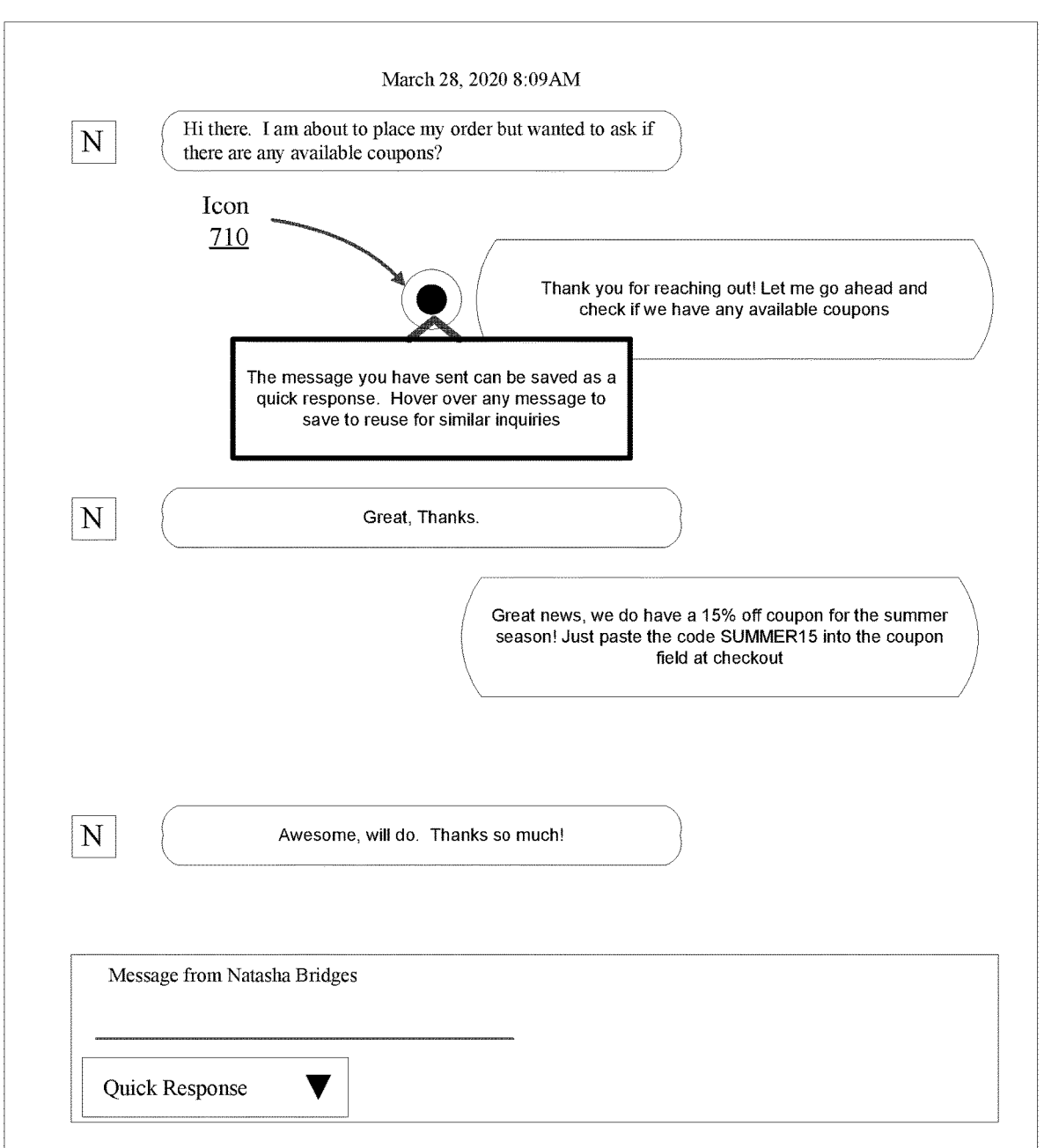
FIG. 7 shows a prompt help desk agent to create additional pre-written responses from past received messages, according to an embodiment.

FIG. 7 shows a prompt help desk agent to create additional pre-written responses from past received messages, according to an embodiment. An embodiment includes detecting that the agent has sent a response to any inbound message in the past, and further includes putting or displaying a special icon 710 next to the message denoting that it can be saved as a pre-written response. Clicking on the icon 710 will prompt the agent with a pre-populated dialog that can be edited and saved for future use.

FIG. 8 is a flow chart that includes steps of a method of implicitly associating user intents to agent selected responses, according to an embodiment. A first step 810 includes receiving, by a server, a first input text message from a user (customer). A second step 820 includes displaying, by the server, the first input text message to an agent (merchant). A third step 830 includes receiving, by the server, a first response to the first input text message from the agent (merchant). A fourth step 840 includes computing a first intent with the first input text message. It is to be understood that the fourth step 840 can occur before the second step 820. Further, as will be described, in an automated mode, the second and third steps may be skipped. A fifth step 880 includes prompting, by the server, the agent (merchant) whether to associate the first response with the computed first intent of the first input text message. A sixth step 860 includes recording the first response with the computed first intent of the first input message when the agent indicates an association between the first response with the computed first intent of the first input message.

As previously described, for an embodiment, the first computed intent is computed by entering the first input text message into a trained language model. The trained language model generates an intent based on the input first input text message, which for the first time that the first input text message is entered or submitted is the first intent. Later, new input text messages are input to the trained language model. If the intent of the new input text message(s) is the first computed intent, then the association with the first response is determined from the previous recording of the first computed intent with the first response.

For an embodiment, once the first intent is associated with the first response, other future input text messages that are associated with the first intent will receive the response back in response to the future input text messages. Alternatively, the response may be suggested to the agent for the future input text message. The agent can then select the response for the future input text messages. For an embodiment, the selection is from a suggested list of responses that includes the response, and other possible responses, such as, responses that have been provided in the past.

For a specific embodiment, receiving the first response to the first input text message from the agent (merchant) includes displaying, by the server, a configurable menu of responses to the first input text message to the agent (merchant), and receiving, by the server, the first response as a selection of one of the configurable menu of responses from the agent (merchant).

An embodiment further includes facilitating, by the server, sending of the first response to the user (customer) in response to the first input text message.

An embodiment further includes receiving, by the server, a second input text message from one or more users (customers) and computing the first intent with the second input text message. That is, using the same process (for example, a natural language processor) an intent is computed for the second input text message which, for an embodiment, results in the first intent. This embodiment further includes identifying the first response for the second input message based on the recorded association between the first response and the computed first intent, displaying, by the server, a configurable menu of responses to the second input text message to the agent (merchant), wherein the configurable menu of responses includes at least the first response, receiving, by the server, the first response as a selection of one of the configurable menu of responses from the agent (merchant), and facilitating, by the server, sending of the first response to the user (customer) in response to the second input text message.

For an embodiment, the configurable menu of responses includes at least the first response. The configurable menu of response may include the first response, and other possible responses. For an embodiment, the other possible response may include related responses or responses that have been most frequently used in the past. That is, selected responses are tracked, and the responses that were most commonly selected as responses in the past are additionally provided as responses for future input text messages, such as, the second input text message.

As described, at least some embodiments include receiving, by the server, a second input text message from one or more users (customers), computing the first intent with the second input text message, and identifying the first response for the second input message based on the recorded association between the response and the computed first intent. For this embodiment, as previously described, the agent (merchant) approval may be bypassed, and the server directly and automatically operates to facilitate sending of the first response to the user (customer) in response to the second input text message. As previously described, for an embodiment, for an automated response, the server 101 directly facilitates sending of the first response to the user (customer) in response to the second input text message without confirmation by the agent (merchant). That is, at some point the system may become fully automated as the quality of the generated responses gets better and better. For an embodiment, the quality of the response is monitored, and this monitoring can be used to evaluate response selection by the agent (merchant). Further, the quality monitoring of the responses can be used to determine when to fully automate and directly provide responses without the agent making a selection.

An embodiment includes generating other intents (other than the first intent) for other received input text messages. That is, an embodiment includes receiving, by a server, a second input text message from a user (customer), displaying, by the server, the second input text message to an agent (merchant), receiving, by the server, a second response to the second input text message from the agent (merchant), computing a second intent with the second input text message, prompting, by the server, the agent (merchant) whether to associate the second response with the computed second intent of the second input text message, and recording the second response with the computed second intent of the second input message when the agent indicates an association between the second response with the computed second intent of the second input message.

As previously described, an embodiment includes monitoring, by the server, actions of the user (customer) in response to receiving the first response. An embodiment includes evaluating or estimating a level of quality of the first response based on the monitored actions of the user (customer). For an embodiment, evaluating the quality includes determining whether the monitored actions of the user (customer) include the user (customer) purchasing a product or service of the agent (merchant) as a result of having received the first response. At least some embodiments include ranking the first response based on the monitored actions of the user (customer) and determining whether to continue to automatically generate responses by identifying responses based on recorded associations between past responses and previously computed intents, or to receive responses from the agent (merchant) for future input text messages. That is, an embodiment includes automatically generating responses to input text messages based on previous responses that have been recorded with computed intents per the agent indicating an association. However, monitoring of the quality and ranking of the automatically generated responses by monitoring the actions of the user can indicate that the automatic response generation is falling below a desired quality threshold, and therefore, the agent should then be providing or aiding the response selection.

As previously described, an application can be downloaded to the computed device of the user. The application then tracks the actions of the user when the user receives a response from the agent to determine the quality of the response received from the agent. For an embodiment, the response includes an indicator that the application loaded on the computing device recognizes as a trigger to monitor the actions of the user in response to receiving the response from the agent. As previously described, the quality of the response can be fed back to a merchant so that the merchant can monitor the quality of the responses to input text messages received from the users (customers). Further, if automated response generation is being utilized, the monitoring of the quality of the responses can be used to evoke an agent to aid in the generation of the responses.

As previously described, for an embodiment, the server 101 receives a second input text message from one or more users (customers), and the first intent is computed with the second input text message. As previously described, a language model may be used for computing the intent, such as, the first intent. Accordingly, because the first intent has been associated with the first response, for an embodiment, the first response is identified for the second input message based on the recorded association between the response and the computed first intent. However, for an automated response, the server 101 directly facilitates sending of the first response to the user (customer) in response to the second input text message without confirmation by the agent (merchant). That is, at some point the system may become fully automated as the quality of the generated responses gets better and better. For an embodiment, the quality of the response is monitored, and this monitoring can be used to evaluate response selection by the agent (merchant). Further, the quality monitoring of the responses can be used to determine when to fully automate and directly provide responses without the agent making a selection.

As previously described, for an embodiment, the response generation is dependent on the intent computation. For an embodiment, when a computed intent is exactly the same as a previously determined intent, then the response can be automatically generated because the exact intent previously had a response generated for it. For example, if a second input message has an intent computed that is exactly the same as the first intent, then the first response that was recorded with the first computed intent can be automatically selected. However, if the second input message has an intent computed that is within a first threshold of the computed first intent, then the agent is displayed the response and other associated responses. However, if the second input message has an intent computed that is greater than a second threshold of the first intent, then the agent is prompted for a new response.

Semantic Meaning

For an embodiment, associating the response with the first intent includes assigning an ID to the response. For an embodiment, the ID of the response includes additional semantic meaning which is displayed to the agent (merchant) providing the agent (merchant) with information regarding an intent of a response associated with the at least one ID.

Presentation of Intents

At least some embodiments further include grouping messages presented to the agent (merchant) based on categories of intents associated with the messages. For example, for an embodiment, a user interface of the agent (merchant) includes bucketing of the responses by intent and presenting the intent buckets with the responses associated with each intent. The agent (merchant) can then select a response from the intent buckets provided to the agent (merchant). For example, if several input text messages are associated with an intent (for example, the intent "refund") then the user interface provided to the agent (merchant) can include a filter (in the form of presented buckets) that filters out other input text messages that have a different intent (for example, the intent "sales"). The agent (merchant) can then select a response from the filtered intents. Further, as will be described, the intents can be ranked and presented to the agent (merchant) accordingly.

Ranking Intents

At least some embodiments further include ranking the intents, and then displaying groups of messages of each of the intents according to the rank of each of the intents. For an embodiment, the rankings can be preselected based on a perceived value of the intent. A conversation between the agent and the customer can be presented to the agent so that the most important text messages and responses (as determined by the ranking of the associated intents) are presented at the top of the display of the agent (merchant). For an embodiment, the user interface of the agent (merchant) displays a conversation that includes several responses in descending order of rank, such that, the most "important" per the ranking of the associated intents are at the top. For an embodiment, a conversion can be associated with the most recent intent associated with the responses of the conversation. Again, the rankings can be based on a perceived value of the intent. That is, a "sales" intent may be ranked higher than a "refund" intent.

For an embodiment, an input text message is associated with a pre-selected set of intents that a natural language model can detect and generate (compute). For example, a short list of possible intents that may be computed by the natural language model may include "refund", "checkout", "happy customer", "unimportant", or "hello". For an agent (merchant) the different intents can be prioritized or ranked. For an ecommerce agent, the intents "sale" and "checkout" are likely to be ranked higher than "hello" or "unimportant".

Multiple Input Text Message with a Single Intent

At least some embodiments include receiving, by a server, multiple input text messages from the user (customer), displaying, by the server, one or more of the multiple input text messages to the agent (merchant), receiving, by the server, a response to the one or more of the multiple input text messages from the agent (merchant), computing an intent with the one or more of the multiple input text messages, prompting, by the server, the agent (merchant) whether to associate the response with the computed intent of the one or more of the multiple input text messages, and recording the response with the computed intent of the one or more of the multiple input text messages when the agent indicates an association between the response with the computed intent of the one or more of the multiple input text messages. That is, for an embodiment multiple input text messages are associated with an intent. For an embodiment, a lookback window includes multiple input text messages. For an embodiment, the lookback window includes N input text messages received within a time window of time. That is, the user (customer) may provide multiple (N) input text messages in a row within the timing of the time window. For an embodiment, the multiple (N) input text messages are ranked and the intent is computed for the highest ranking of the multiple (N) input text messages. However, for another embodiment, the intent is computed for all of the N input text messages simultaneously. For an embodiment, the intents are ranked by keywords that are included within the intent. For example, a sales intent may be ranked higher than a refund intent. For an embodiment, the rankings of the intents may be based on a timing of the input message(s) associated with the intents.

Multiple Response for a Single Intent

At least some embodiments include multiple responses for a single intent. For an embodiment, multiple of the responses are associated with the intent of the input text message. For an embodiment, a subset of the multiple responses is associated with the intent of the input text message. For an embodiment, the responses are ranked, and the highest ranked response is associated with the intent of the input text message. For an embodiment, the timing of the responses (or the timing between responses) by the agent (merchant) sets the rankings of the different responses of the agent (merchant). For example, for an embodiment, the first response of the agent (merchant) and response of the agent (merchant) within a time window (such as, within one minute) of the first response are all associated with the intent of the input text message. Accordingly, at least some embodiments include receiving, by the server, N responses to the first input text message from the agent (merchant), adaptively selecting a selected response to the first input text message based on a timing in which each of the N responses are received from the agent (merchant), prompting, by the server, the agent (merchant) whether to associate the selected response with the computed first intent of the first input text message, and recording the first response with the computed first intent of the first input message when the agent indicates an association between the first response with the computed first intent of the first input message. As described, the selected response can be based on a ranking of each of the N responses provided by the agent (merchant). As described, the ranking can be based on the time or timing it took the agent (merchant) to respond back to the input text message. For example, if the agent sends back M1 (first response) at 11:10:00 and then M2 (second response) at 11:10:02 and then M3 (third response) at 18:00:00, the M2 (second response) may be the highest ranked response because M2 is most likely to be the correct response.

Annotated Datasets

At least some embodiments include generating a plurality of annotated datasets based on associating each of the first input text message and the second input text message with the response having the assigned ID. For an embodiment, data annotation is a process of labeling data with relevant tags to make the data easier for computers to understand and interpret. This data can be in the form of images, text, audio, or video, and data annotators need to label it as accurately as possible. At least some embodiments include training a natural language intent classification model based on the plurality of annotated datasets. That is, the intents can be computed by the natural language intent classification model, and the plurality of annotated datasets are used in training of the natural language intent classification model. As the size of the plurality of annotated data set grows, the training of the natural language intent classification model get better and better.

For an embodiment, the assigned ID of the response includes additional semantic meaning which is displayed to the agent (merchant) providing the agent (merchant) with information regarding an intent of a response associated with the at least one ID.

Editing of Responses

At least some embodiment, include receiving, by the server, editing of the first response by the agent (merchant), checking, by the server, whether the edited response has changed greater than a threshold amount, and maintaining the ID of the edited response when changed less than the threshold amount. For these embodiments, it is possible to have "false positives. That is, the agent (merchant) may select a response, but then edit the response so heavily that one can no longer infer that the message it's responding to corresponds to the same class as what the original response was intended to address. To reduce these false positives, at least some embodiments include applying a variety of approaches to test that the final edited response that is received by the server is "close enough" to the selected response. Measures of closeness include but are not limited to Levenshtein distance or cosine similarity in an appropriate embedding space.

At least some embodiments include receiving, by the server, editing of the responses by the agent, checking, by the server, whether the edited responses have changed greater than a threshold (preselected) amount, and maintaining the ID of the edited responses that have changed less than the threshold amount. For an embodiment, the threshold is preselected based on a type of conversation classification of the merchant. For example, the conversation of the merchant may be classified as a customer service type or as a sale type. Accordingly, different threshold amounts can be adaptively selected based on the classification of the merchant. The amount of change of the edited response can be determined, for example, using different metrics, such as, edit distance.

At least some embodiments include generating, by the server, a look back window that determines a number N of input text messages received from the user (customer) that the assigned ID of the response is associated with. For an embodiment, N is dynamically adjusted and includes text messages received from the user within a selected time threshold.

Alternate Embodiments

Figure 9:
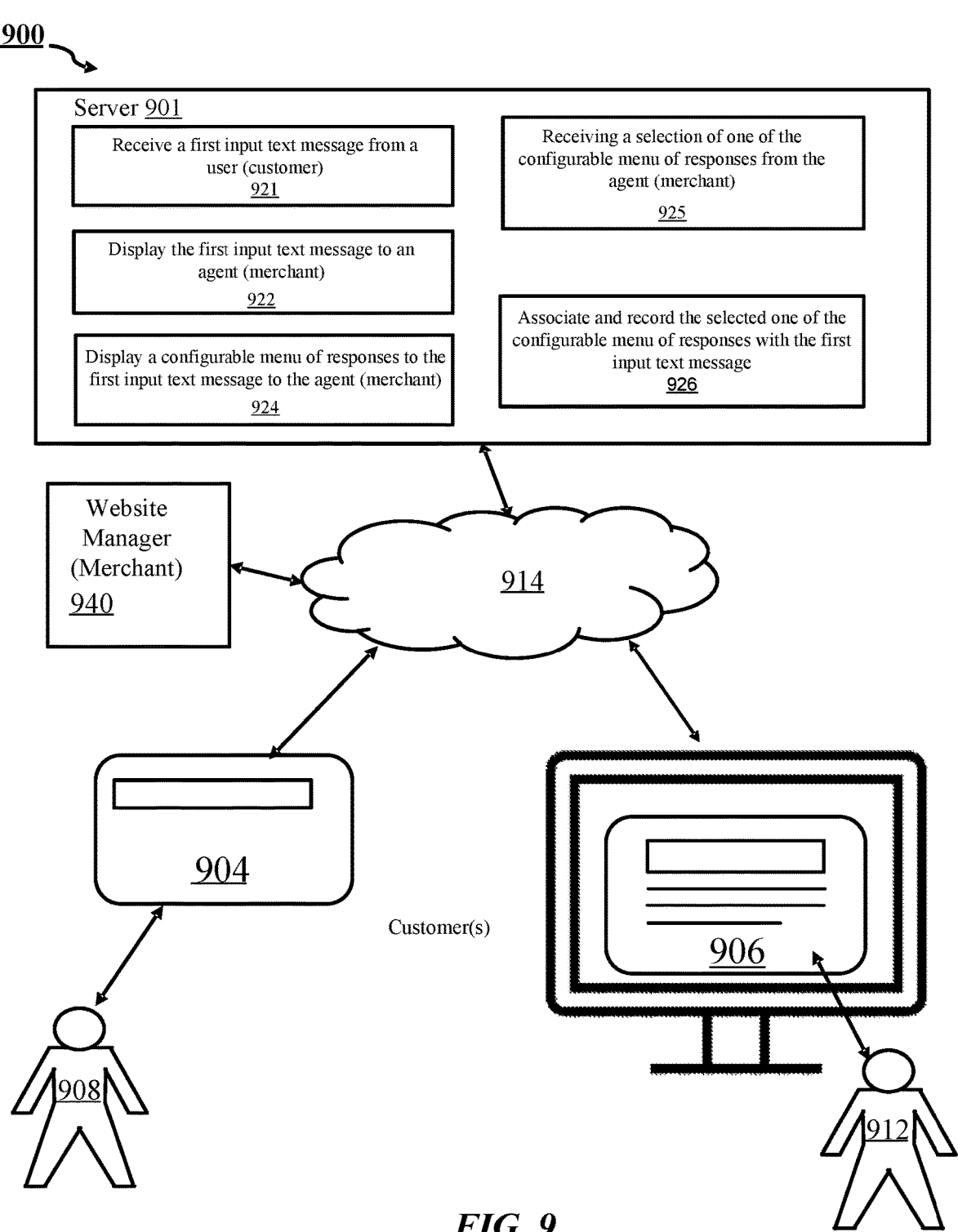
FIG. 9 shows a system for implicitly annotating textual data in conversational messaging, according to an embodiment.

FIG. 9 shows a system 900 for implicitly annotating textual data in conversational messaging, according to an embodiment. The system 100 includes a server 901. For an embodiment, the server 901 is electronically connected through a network 914 to a merchant server 940 of a merchant, and electronic devices 904, 906 of site visitors (customers of the merchant) 908, 912.

At least some of the described embodiments provide annotation generation for conversational data in 2-way messaging systems. Some exemplary 2-way messaging systems include SMS (Short Message Service), WhatsApp WeChat Facebook Messenger®, and similar platforms that enable 2-way textual communication. At least some of the described embodiments benefit operators of the server 101 by providing the 2-way messaging system and permitting the operator to collect annotations for utterances received through the system.

At least some of the described embodiments treat the two sides (for example, merchant and customer) of the messaging conversation asymmetrically. For descriptive purposes, the two parties to the conversation may be referred to as Alice and Bob. Suppose Company C operates the server 101 that Alice (for example, a merchant) is using to communicate with Bob (for example, a customer of the merchant A) via 2-way messaging. For an embodiment, Bob (customer) may also be using service of company C. At least some of the described embodiments enable Company C to use Alice's interactions with Bob's to collect annotations of Bob's messages. For at least some embodiments, the server 101 provides a way for Alice (merchant) to store and then select responses. For an embodiment, the responses are pre-written. For an embodiment, the responses are electronically generated.

For an embodiment, a merchant server 940 operates and manages a ecommerce website of the merchant. For an embodiment, the merchant server 940 includes a server of a business (the merchant) that operates to directly control the ecommerce website. For an embodiment, the merchant server 940 includes a combination of the business (merchant) and a third party to operate to control the ecommerce website. For an embodiment, the merchant of the merchant server 940 is a customer of the operator of the server 901. For an embodiment, the merchant server 940 is a combination of the customer of the operator of the server 901 and a third party (such as, a Shopify platform). For an embodiment, the merchant server includes one or more third party servers.

For an embodiment, the server 901 operates to receive 921 a first input text message from a user (customer), display 922 the first input text message to an agent (merchant), display 924 a configurable menu of responses to the first input text message to the agent (merchant), receive 925 a selection of one of the configurable menu of responses from the agent (merchant). For an embodiment, the server is configured to both facilitate sending the selected of one of the configurable menu of responses to the user (customer) and associate and record 926 the selected one of the configurable menu of responses with the first input text message. For at least some of the described embodiments, the associating and recording is not visible to the user (customer). Further, for at least some embodiments, selecting the response from the menu includes an act of annotating the message of the user (customer), wherein the annotating includes associating and recording the link between the message of the user (customer) and the response of the agent (merchant). A primary point of uniqueness and value of the described embodiments is that the agent (merchant) is selecting the one of the configurable menu of responses to facilitate the sending of the one of the configurable menu of responses back to the user (customer) in response to the first input text message, but the server additionally associates and records the selected one of the configurable menu of responses with the first input text message. That is, the agent (merchant) is selecting the response from the configurable menu not with the intention of annotating the data, but with the intention of sending that response back to the user (customer). That is, generally annotating data (such as, the first input text message) is a very expensive labor-intensive process. However, the described embodiments advantageously take advantage of actions of the agent (merchant) to annotate the data (input text messages) based on the actions of the agent (merchant) selecting a response to the input text messages of the user (customer). While the agent may be a merchant and the user may be a customer of the merchant, it is to be understood that for at least some embodiments the agent and the user may have different relationships. For example, the agent a merchant may be, for example, two individuals texting over say WhatsApp® or FB Messenger®, where there's no merchant/customer relationship.

For at least some embodiments, the server 901 further operates to receive a second input text message from one or more users (customers), receive the selection of the one of the configurable menu of responses from the agent which is the same as the response for the first input text message, and associate and record the same selected one of the configurable menu of responses with the second input text message. As described, a single response (label) is associated and recorded for both the first input text message and the second input text messages. That is, a single response (label) is associated with multiple input text messages (utterances).

For at least some embodiments, associating the selected one of the configurable menu of responses with the input text message includes assigning an ID to the selected one of the configurable menu of responses. At least some embodiments further include generating a plurality of annotated datasets based on associating each of the first input text message and the second input text message with the selected one of the configurable menu of responses having the assigned ID. For an embodiment, data annotation is a process of labeling data with relevant tags to make the data easier for computers to understand and interpret. This data can be in the form of images, text, audio, or video, and data annotators need to label it as accurately as possible.

Figure 10:
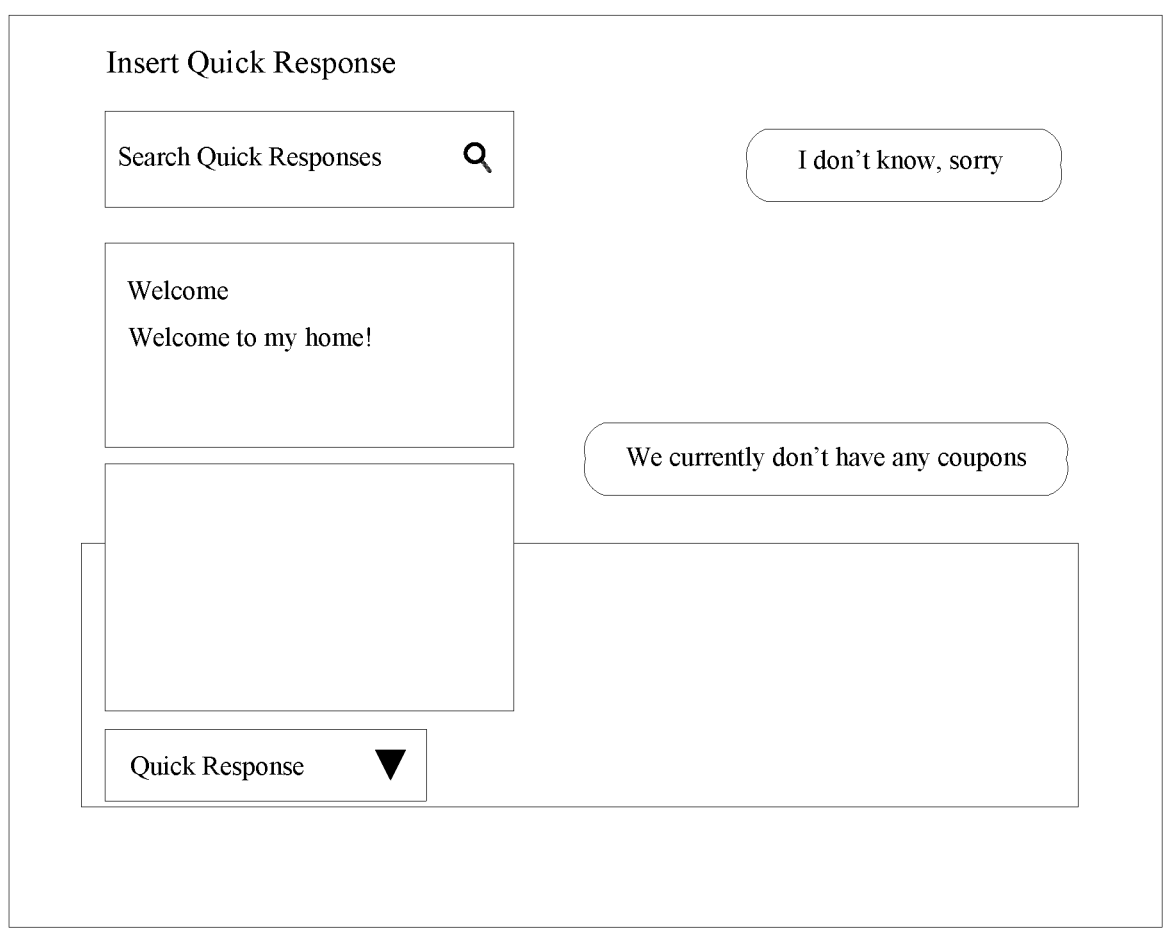
FIG. 10 shows a display that includes responses to an input text message, according to an embodiment.

FIG. 10 shows a display that includes responses to an input text message, according to an embodiment. For an embodiment, initially the configurable menu of responses includes pre-written responses. The display of FIG. 10 shows an example of the configurable menu of pre-written responses and the agent in the process of selecting a pre-written response. The pre-written responses can originate, for example, as an importation from a file from the merchant.

For an embodiment, the initially configurable menu of responses includes electrically generated responses. That is, the responses can be generated by a text generator, and then displayed. For an embodiment, the text generator includes a natural language processing model, such as, GPT-3®.

At least some embodiments further include training a natural language intent classification model based on the plurality of annotated datasets. For at least some embodiments, the natural language classification model provides suggested responses. For at least some embodiments, the natural language classification model provides automated responses which can then be provided for selection by the agent (merchant).

Figure 11:
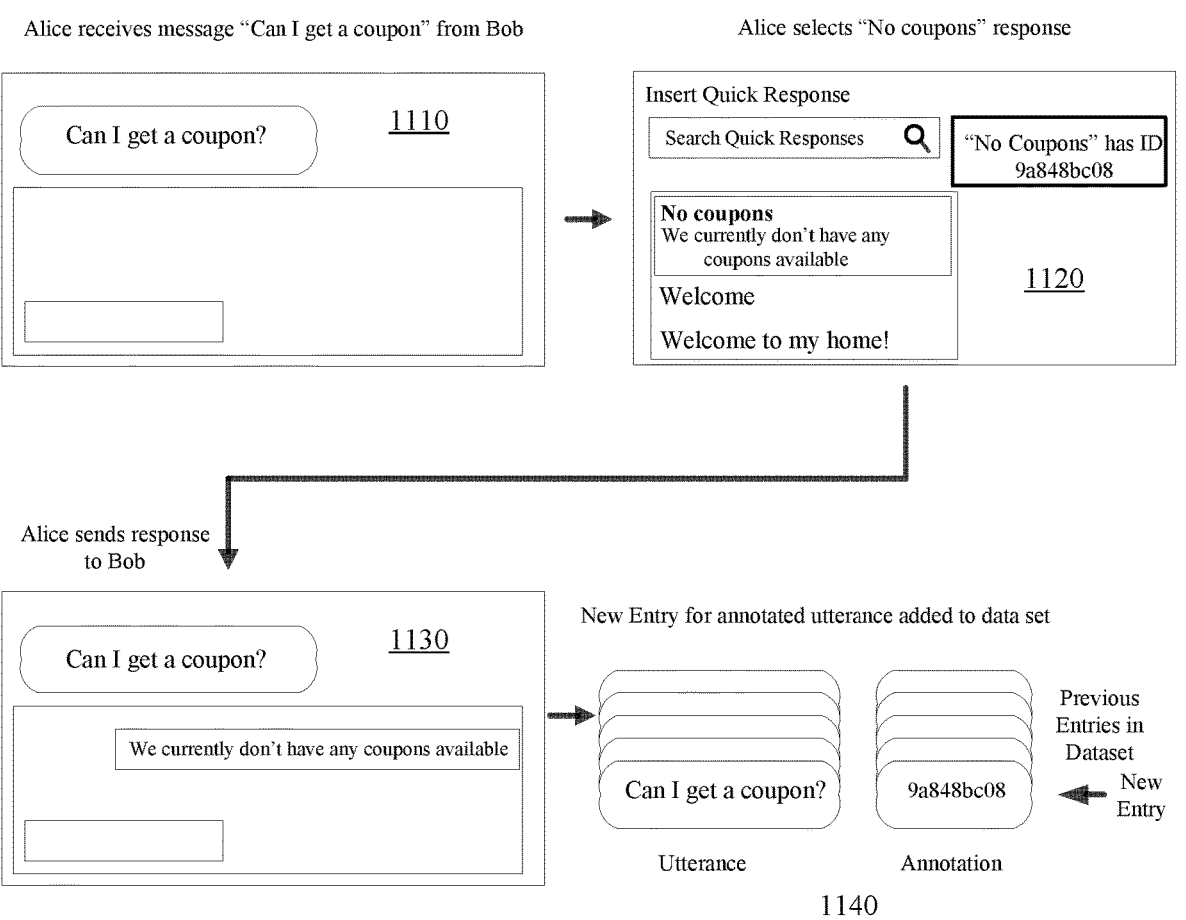
FIG. 11 shows a display that includes a merchant opening and selecting a common pre-written response to multiple input text messages (utterances) and adding to a dataset that includes utterance/ID pairs, according to an embodiment.

FIG. 11 shows a sequence of steps that includes a merchant opening and selecting a common pre-written response to multiple input text messages (utterances) and adding to a dataset that includes utterance/ID pairs, according to an embodiment. The sequence of the steps of FIG. 3 outlines the process of at least some of the described embodiments. The first step 1110 includes receiving the input message ("Can I get a coupon) from the user (customer). The second step 1120 includes receiving a select pre-written response ("We currently don't have any coupons available") from the agent (merchant). The third step 1130 includes the selected pre-written response being provided to the user (customer). The fourth step 1140 includes creating the association between the pre-written response's assigned ID and the input message. While described here as pre-written responses, as described, for other embodiments the responses are not pre-written, but can be, for example, generated in real-time.

For an embodiment, each response (for example, a pre-written response) is identified by a unique ID. One can think of this as an opaque ID such as an auto-incrementing integer or a UUID.

For an embodiment, when Alice (merchant) selects a pre-written response to reply to a message from Bob (customer), the server 101 links the unique ID representing the pre-written response to Bob's message and saves the unique to a database. For an embodiment, the ID is treated as the label. For an embodiment, when Alice (merchant) uses the same pre-written response in response to different messages, the same ID is associated with those messages. The resulting data set consists of utterance/ID pairs, where each utterance is a message from someone Alice (merchant) had a conversation with and the label is the ID of the pre-written response that Alice used to respond. For an embodiment, responses that did not use a pre-written response are not represented in the data set. This data set can be used as training data because Alice (merchant) uses the same pre-written response to two different messages. Therefore, it can be inferred that those two messages were of a similar nature and hence can be classified with the same ID.

FIG. 12 shows a display that includes multiple responses for prompting the merchant, and further includes mapping opaque IDs to a semantic class, according to an embodiment. For at least some of the described embodiments, the labels are opaque IDs. However, at least some embodiment further includes supporting a more semantically meaningful label. For example, if we have a pre-written response like "We don't ship to Canada" with ID 04938, and we see a bunch of messages tagged with this ID, then a person could manually inspect those messages as well as the pre-written response and assign the semantic label of "Ask if you ship to Canada" to messages labeled with the opaque ID 04938.

For an embodiment, semantic labels are added post hoc by manually identifying the meanings of the different labels, but it's also possible to attach semantic labels from a pre-existing classification ontology. There are several ways to incorporate pre-existing semantic meaning into the IDs. For an embodiment, an agent (merchant) is allowed to assign a unique human-readable title and use that as an ID. For example, if the pre-written response expresses "You're welcome" in a personalized way, then the agent (merchant) may save that pre-written response under the title "You're welcome".

For an embodiment, the server 901 assigns unique semantic titles by proactively suggesting different types of pre-written responses for Alice (merchant) to use. For example, as shown in FIG. 12, for an ontology that includes classes for "Greeting" and "Help" (these are classes for messages that Bob (customer) may send), then the server 901 can suggest to Alice to pre-write two responses, Pre-written Response 1 could be in response to "Greeting" messages and Pre-written Response 2 could be in response to "Help" messages. For an embodiment, those IDs (1 and 2) are then mapped to the classes "Greeting" and "Help" when being recorded in the data.

FIG. 13 shows a system for implicitly annotating textual data in conversational messaging, according to an embodiment. For an embodiment, at least one ID of the responses includes additional semantic meaning which is displayed to the agent (merchant) providing the agent (merchant) with information regarding an intent of a response associated with the at least one ID. As shown, at least some embodiments include generating 1326 a plurality of annotated datasets based on associating each of the first input text message and the second input text message with the selected one of the configurable menu of responses having the assigned ID. For an embodiment, data annotation is a process of labeling data with relevant tags to make the data used to train models that will compute the annotation on new data. This data can be in the form of images, text, audio, or video, and data annotators need to label the data as accurately as possible.

For at least some embodiment, labels associated with responses include labels that are opaque. However, at least some embodiments further include semantically meaningful label(s). For example, if a pre-written response includes something like "We don't ship to Canada" with ID 04938, and other messages are identified to be tagged with this ID, then a person could manually inspect those messages as well as the pre-written response and assign the semantic label of "Ask if you ship to Canada" to messages labeled with the opaque ID 04938.

As described, for an embodiment, the semantic labels are added post hoc by manually identifying the meanings of the different labels, but it's also possible to attach semantic labels from a pre-existing classification ontology. There are several ways to incorporate pre-existing semantic meaning into the IDs:

One method is to allow the user to assign a unique human-readable title and use that as an ID. For example, if the pre-written response expresses "You're welcome" in a personalized way, then the user may save that pre-written response under the title "You're welcome".

For an embodiment, the server 901 is configured to generate a look back window that determines a number N of input text messages received from the user (customer) that the assigned ID of the selected one of the configurable menu of responses is associated with. For an embodiment, the look back window doesn't determine what is displayed to the user (customer). Rather, the look back window determines how many messages received from the user (customer) are associated with the assigned ID of the merchant selected response. For example, the server may receive two different messages from the user (customer), such as, "I don't understand your product" or "It doesn't turn on for me". The selected response may be "I'm sorry to hear you're having trouble using our product". For an embodiment, that response is associated with both of the messages "I don't understand your product" and "It doesn't turn on for me".

Figure 14:
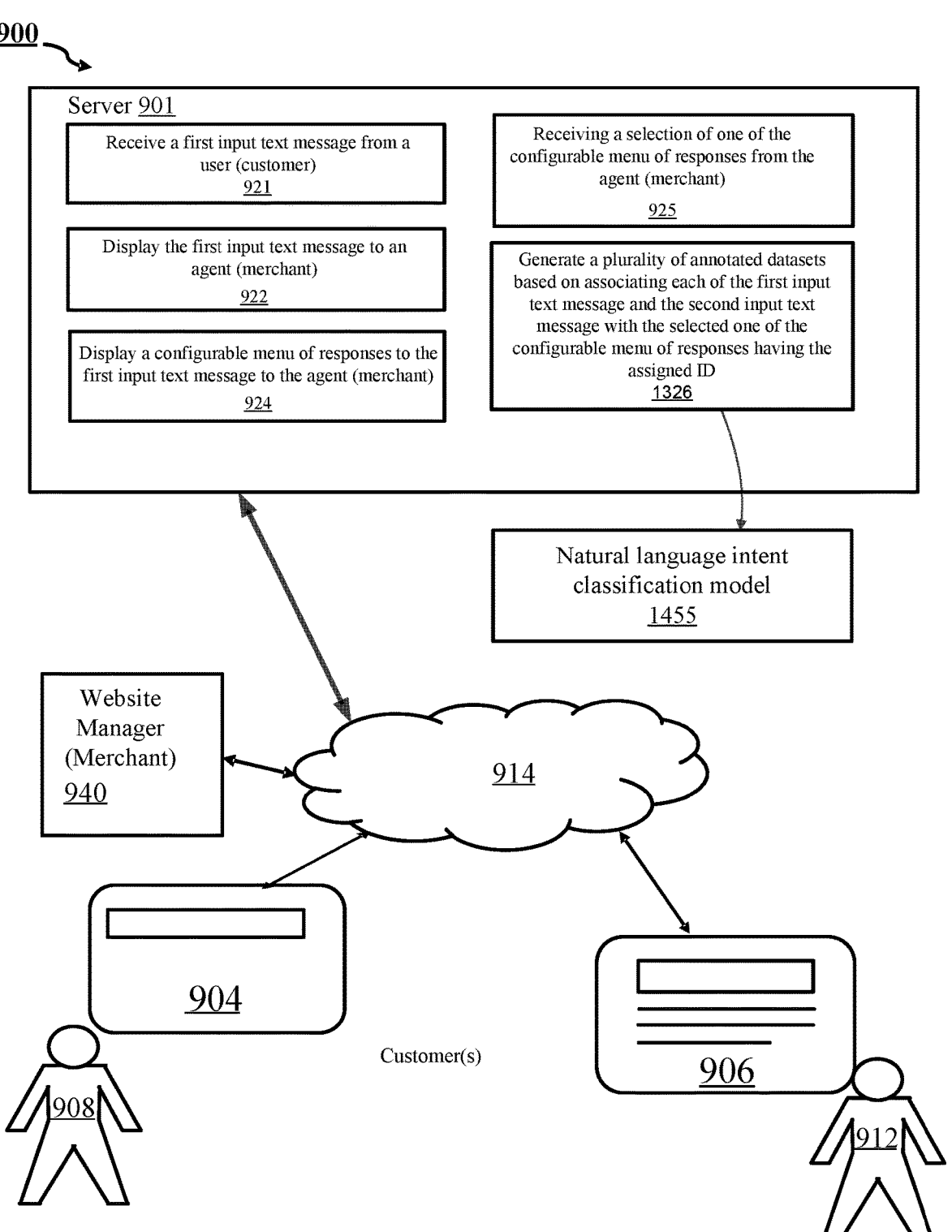
FIG. 14 shows a system for implicitly annotating textual data in conversational messaging, wherein the annotated datasets are used for fine-tuning a natural language intent classification model, according to an embodiment.

For an embodiment, the number N of input text messages of the look back window is selected or set based on identifying how quickly messages were sent one after another. For an embodiment, the lookback window includes all N messages that were sent within a selected amount of time (such as, 5 seconds) of each other. For an embodiment, the number N of input text message is determined based on identifying all user messages sent without an intervening agent message. That is, for an embodiment, N is dynamically selected based on the identifying how quickly messages were sent one after another, or based on identifying all user messages sent without an intervening agent message FIG. 14 shows a system for implicitly annotating textual data in conversational messaging, wherein the annotated datasets are used for training a natural language intent classification model, according to an embodiment. As shown, a natural language intent classification model 1455 generates responses to a text message input. The responses are fed to the display of the menu of responses that can be selected by the agent (merchant). Further, the annotated responses 1326 are fed back to the natural language intent classification model 1455. It is to be understood that FIG. 14 shows an embodiment in which a natural language intent classification model 1455 is trained and used for generating suggested or automated responses to the text input message. However, it is to be understood that other embodiments include other uses of the trained natural language intent classification model 1455.

Figure 15:
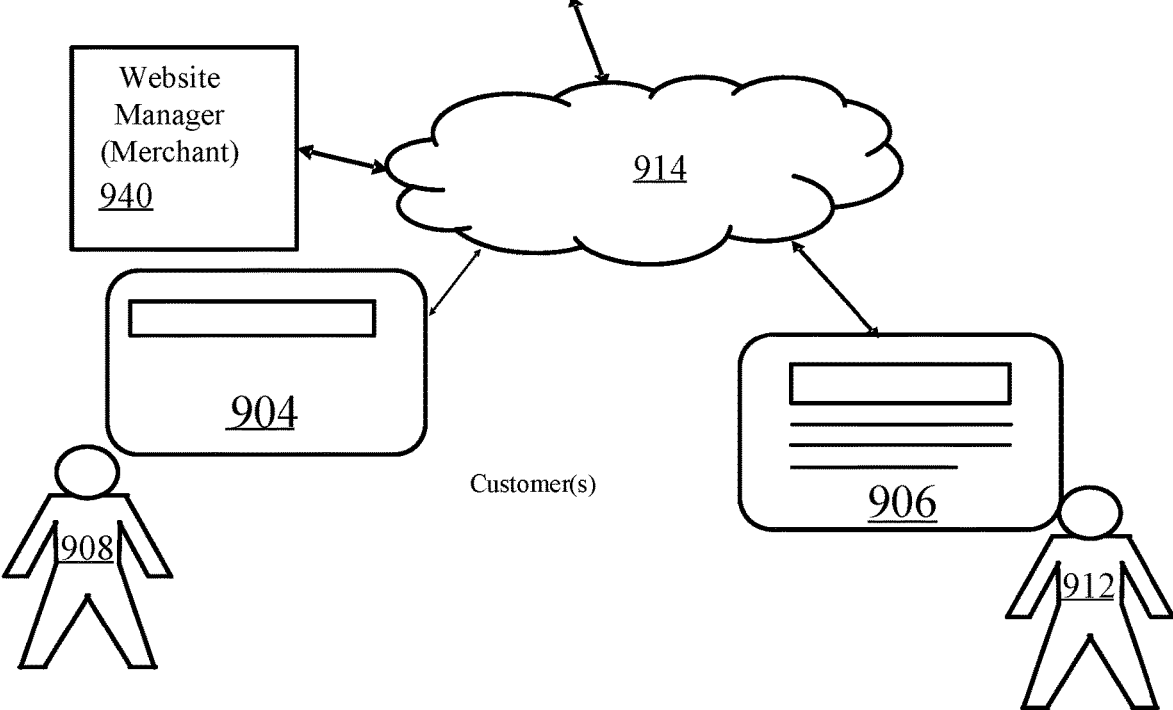
FIG. 15 shows a system for implicitly annotating textual data in conversational messaging wherein responses can be edited, according to an embodiment.

FIG. 15 shows a system for implicitly annotating textual data in conversational messaging wherein responses can be edited, according to an embodiment. For at least some embodiments, the responses may be edited 1565 before being received by the server 901. For these embodiments, it is possible to have "false positives. That is, the agent (merchant) may select a response, but then edit the response so heavily that one can no longer infer that the message it's responding to corresponds to the same class as what the original response was intended to address. To reduce these false positives, at least some embodiments include applying a variety of approaches to test that the final edited response that is received by the server is "close enough" to the selected response. Measures of closeness include but are not limited to Levenshtein distance or cosine similarity in an appropriate embedding space.

At least some embodiments include receiving, by the server, editing of the responses by the agent, checking, by the server, whether the edited responses have changed greater than a threshold (preselected) amount, and maintaining the ID of the edited responses that have changed less than the threshold amount. For an embodiment, the threshold is preselected based on a type of conversation classification of the merchant. For example, the conversation of the merchant may be classified as a customer service type or as a sale type. Accordingly, different threshold amounts can be adaptively selected based on the classification of the merchant. The amount of change of the edited response can be determined, for example, using different metrics, such as, edit distance.

FIG. 16 shows a system for implicitly annotating textual data in conversational messaging wherein sequences or combinations of responses are associated and recorded for an input text message, according to an embodiment. For an embodiment, the server 901 is configured to receive 1625 a selection of a plurality of the configurable menu of responses from the agent (merchant), and associate and record 1626 the selected plurality of the configurable menu of responses with the first input text message. That is, multiple responses are selected by the merchant for a single input text message. Further, for an embodiment associating the selected plurality of the configurable menu of responses with the input text message includes assigning an ID to the selected plurality of the configurable menu of responses.

An embodiment includes more than a single response. In text conversations, people often break up single thoughts into multiple messages. Therefore, an embodiment includes more than one message in the lookback window. Such dynamic lookback windows may be set using a variety of techniques, such as including a fixed number of the most recent messages Alice sent, or a variable number of most recent messages Alice sent within a time threshold (e.g. within 1 minute of each other).

An embodiment includes excluding some of the most recent messages Alice (merchant) has sent. For example, Alice (merchant) may send multiple pre-written responses in a row to the same message from Bob (customer). It may therefore be beneficial to not associate certain pre-written messages with Bob's messages. The dynamic lookback windows may be set using a variety of techniques, such as only creating annotations based on the first pre-written response sent by Alice without any intervening messages from Bob, or only creating annotations based on the last pre-written response sent by Alice without any intervening messages from Bob in a sequence of pre-written responses. Another embodiment includes assigning each pre-written response a priority and associating with Bob's message the pre-written response with the highest priority in an uninterrupted sequence of pre-written responses from Alice. At least some embodiments further include selecting a sequence of the selected plurality of configurable menu of responses based on the first input text message. For an embodiment, the sequence is selected by the agent (merchant). At least some embodiments further include extracting annotations from the sequence including selecting a response of the sequence of configurable menu of responses based on priorities associated with each of the responses of the sequence of configurable menu of responses. At least some embodiments include rules for extracting annotations from these sequences. For example, certain responses may be considered to be less meaningful than others.

An embodiment includes more than one of the most recent messages the user (customer) has sent. In text conversations, people often break up single thoughts into multiple messages. Therefore, it may be better to include more than one message in the lookback window. Such dynamic lookback windows may be set using a variety of techniques, such as including a fixed number of the most recent messages Bob sent, or a variable number of most recent messages Bob sent within a time threshold (e.g. within 1 minute of each other).

FIG. 17 is a flow chart that includes steps of a method of implicitly annotating textual data in conversational messaging, according to an embodiment. A first step 1710 includes receiving, by a server, a first input text message from a user (customer). A second step 1720 includes displaying, by the server, the first input text message to an agent (merchant). A third step 1730 includes displaying, by the server, a configurable menu of responses to the first input text message to the agent (merchant). A fourth step 1740 includes receiving, by the server, a selection of one of the configurable menu of responses from the agent (merchant). A fifth step 1750 includes facilitating, by the server, sending of the selected of one of the configurable menu of responses to the user (customer). A sixth step 1760 includes associating and recording the selected one of the configurable menu of responses with the first input text message.

As previously described, a primary point of uniqueness and value of the described embodiments is that the agent (merchant) is selecting the one of the configurable menu of responses to facilitate the sending of the one of the configurable menu of responses back to the user (customer) in response to the first input text message, but the server additionally associates and records the selected one of the configurable menu of responses with the first input text message. That is, the agent (merchant) is selecting the response from the configurable menu not with the intention of annotating the data, but with the intention of sending that response back to the user (customer). That is, generally annotating data (such as, the first input text message) is a very expensive labor-intensive process. However, the described embodiments advantageously take advantage of actions of the agent (merchant) to annotate the data (input text messages) based on the actions of the agent (merchant) selecting a response to the input text messages of the user (customer).

For an embodiment associating and recording is not visible to the user (customer). For an embodiment, the selecting of the response from the menu is also an act of annotating the user's message. That is, selecting of the response from the menu provides an associating and recording the link between the user's message and the selected response.

At least some embodiments further include receiving, by the server, a second input text message from one or more users (customers), receiving, by the server, the selection of the one of the configurable menu of responses from the agent which is same as the response for the first input text message, and associating and recording the same selected one of the configurable menu of responses with the second input text message. That is, a single label is identified for multiple utterances. For an embodiment, associating the selected one of the configurable menu of responses with the first input text message and the second input text message comprises assigning an ID to the selected one of the configurable menu of responses.

Automated Response

For an automated response, the server facilitates sending of the first response to the user (customer) in response to the second input text message without confirmation by the agent (merchant). That is, at some point the system may become fully automated as the quality of the generated responses gets better and better. For an embodiment, the quality of the response is monitored, and this monitoring can be used to evaluate response selection by the agent (merchant). Further, the quality monitoring of the responses can be used to determine when to fully automate and directly provide responses without the agent making a new response selection.

Estimating Quality of Responses

Once a response has been sent in response to an input text message, it is desirable to monitor the quality of the response. Accordingly, the response selection process can be adaptively updated to maintain a quality of the response generated or selected in response to input text messages. In order to monitor the quality of the responses, an embodiment further includes monitoring actions of the user (customer) in response to receiving the first response. For an embodiment, this includes evaluating or estimating a level of quality of the first response based on the monitored actions of the user (customer). For an embodiment, evaluating the quality includes determining whether the monitored actions of the user (customer) include the user (customer) purchasing a product or service of the agent (merchant) as a result of having received the first response. That is, if the user (customer) proceeds to purchase a product or service of the agent (merchant) after receiving the response from the agent (merchant), then it can be assumed that the response was effective and of high quality. An embodiment includes ranking the first response based on the monitored actions of the user (customer). For an embodiment, if the quality of the responses is determined by the user actions to be greater than a predetermined rank and predetermined amount of time, the previously automated response generation may be selected and maintained. However, if the quality of the responses falls below a selected threshold or rankings, then the agent may be prompted for aid in the generation of the responses. Further, for an embodiment, the merchant is provided with the quality of the responses in order that the merchant can monitor the quality of the response selection by the agents of the merchant.

Monitoring of User (Customer) Actions

For an embodiment, the monitored customer actions are used to evaluate the quality of the responses provided to the user (customer). For an embodiment, this includes determining action taken by the user (customer) as a result of receiving the response. That is, the user taking a desired action as a result of having received the response provides for a determination of the quality of the response. For an embodiment, an application is loaded onto each of the computing devices of the users. For an embodiment, the user receiving a response to an input text message triggers the application to monitor actions of the user when the user receives the response. Due to time proximity between the receipt of the response and the actions of the user, the actions of the user may be correlated with the receipt of the response. For an embodiment, the monitored actions include online action performed by the user upon receiving the response. As previously described, the monitored actions can be used to evaluate and possibly rank the quality of the response. For an embodiment, the response provided to the user (customer) in response to the input text message of the user (customer) can include an indicator that the application loaded onto the computing device of the user recognizes as a quality monitoring indicator that indicates to the application to monitor actions of the user in response (triggered) by the user receiving the response. As stated, the monitored actions of the user are used to determine the quality of the response.

For an embodiment, the computing device of a user includes a mobile device. Accordingly, the application loaded on the computing device can be triggered upon receiving the response to then monitor physical actions of the user along with the online actions of the user. For an embodiment, the response includes an indicator that the application identifies as an indication to start monitoring actions of the user. For an embodiment, the sensed actions include the mobile message recipient(s) carrying out a main action that a response is intended to elicit, such as, for example, clicking a link in the response (potentially embedded in an image), or making a purchase on the website linked to in the response. Further, users receive the responses via mobile computing devices, such as, a cellular phone. Accordingly, physical actions of the users can be tracked by the application to determine whether the user(s) carried out a main action that a response is intended to elicit. That is, sensors, such as, location sensors, such as, GPS (global positioning system) sensors, and/or motion sensors (such as, accelerometers, gyroscopes, and/or magnetic sensors) can be used to track the locations and actions of the user(s) to determine whether user(s) performed the main action or another action. Sensed action can include, for example, sensing that the user(s) deviated in behavior (sensed motion) or location. The sensed behavior or sensed location can be used, for example, to determine that the user(s) visited a physical location of the merchant of the marketing manager server 140. Further, actions of the users(s) can be sensed by detecting motions of the user(s) that indicated that the user(s) perused the physical location of the agent and picked up and physically looked at a product. Further, actions of user(s) can be sensed to determine that different user(s) interacted and caused behavior changes between the user(s) and potentially others. The sensed location and actions of user(s) can be used to establish relationships between different users. Once relationships are established, interactions between different of the related users can be sensed and determined to be caused by reception of a response. Such interactions can be determined to be a main action that a response is intended to elicit. Further, combinations or patterns of the actions of the users may be monitored and identified by the application on the user computing device.

The quality of the response can be influenced by identifying selected combinations, sequences, or patterns of a series of sensed actions.

At least some embodiments further include generating a plurality of annotated datasets based on associating each of the first input text message and the second input text message with the selected one of the configurable menu of responses having the assigned ID. For an embodiment, data annotation is a process of labeling data with relevant tags to make the data used to train models that will compute the annotation on new data. This data can be in the form of images, text, audio, or video, and data annotators need to label the data as accurately as possible.

As previously described, at least some embodiments further include fine-tuning a natural language intent classification model based on the plurality of annotated datasets. For an embodiment, the initially configurable menu of responses includes text word generated responses. That is, the responses can be generated by a text generator, and then displayed. For an embodiment, the text generator includes a natural language processing model.

At least some embodiments further include training a natural language intent classification model based on the plurality of annotated datasets. For at least some embodiments, the natural language classification model provides suggested responses. For at least some embodiments, the natural language classification model provides automated responses which can then be provided for selection by the agent (merchant).

As previously described, for at least some embodiments, initially the configurable menu of responses includes pre-written responses.

As previously described, for at least some embodiments, initially the configurable menu of responses includes text word generated responses.

As previously described, for at least some embodiments, at least one of the ID of the responses includes additional semantic meaning which is displayed to the agent (merchant) providing the agent (merchant) with information regarding an intent of a response associated with the at least one ID.

As previously described, at least some embodiments further include receiving, by the server, editing of the responses by the agent, checking, by the server, whether the edited responses have changed greater than a threshold amount, and maintaining the ID of the edited responses that have changed less than the threshold amount. For an embodiment, no association is made if changed greater than the threshold.

As previously described, at least some embodiments further include generating, by the server, a look back window that determines a number N of input text messages received from the user (customer) that the assigned ID of the selected one of the configurable menu of responses is associated with. As previously described, an embodiment includes generating a look back window that determines a number N of input text messages received from the user (customer) that the assigned ID of the selected one of the configurable menu of responses is associated with. For an embodiment, the look back window doesn't determine what is displayed to the user (customer). Rather, the look back window determines how many messages received from the user (customer) are associated with the assigned ID of the merchant selected response. For example, the server may receive two different messages from the user (customer), such as, "I don't understand your product" or "It doesn't turn on for me". The selected response may be "I'm sorry to hear you're having trouble using our product". For an embodiment, that response is associated with both of the messages "I don't understand your product" and "It doesn't turn on for me".

As described, for an embodiment, the number N of input text messages of the look back window is selected or set based on identifying how quickly messages were sent one after another. For an embodiment, the lookback window includes all N messages that were sent within a selected amount of time (such as, 5 seconds) of each other. For an embodiment, the number N of input text message is determined based on identifying all user messages sent without an intervening agent message. That is, for an embodiment, N is dynamically selected based on the identifying how quickly messages were sent one after another, or based on identifying all user messages sent without an intervening agent message.

At least some embodiments further include receiving, by the server, a selection of a plurality of the configurable menu of responses from the agent (merchant) and associating and recording the selected plurality of the configurable menu of responses with the first input text message. For an embodiment, associating the selected plurality of the configurable menu of responses with the first input text message includes assigning an ID to the selected plurality of the configurable menu of responses.

For an embodiment, the agent (merchant) may send multiple pre-written responses in a row to the same message from the user (customer). It may therefore be beneficial to not associate certain pre-written messages with messages of the user (customer). Such dynamic lookback windows may be set using a variety of techniques, such as only creating annotations based on the first pre-written response sent by agent (merchant) without any intervening messages from the user (customer) or only creating annotations based on the last pre-written response sent by agent (merchant) without any intervening messages from user (customer) in a sequence of pre-written responses.

For example, the agent (merchant) may select 3 pre-written responses, such as, Response 1: "I'll check your account status", Response 2: "I'll talk to our shipping and handling partner", and Response 3: "One second while I look into this". When the user (customer) submits the input text messages of "Where's my order", the agent (merchant) responds with Response 3, then Response 2. When the user (customer) submits the input text messages of "My account is locked", the agent (merchant) responds with Response 3, then Response 1.

At least some embodiments further include selecting a sequence of the selected plurality of configurable menu of responses based on the first input text message. For an embodiment, the sequence is selected by the agent (merchant). At least some embodiments further include extracting annotations from the sequence including selecting a response of the sequence of configurable menu of responses based on priorities associated with each of the responses of the sequence of configurable menu of responses. At least some embodiments include rules for extracting annotations from these sequences. For example, certain responses may be considered to be less meaningful than others. In the example above, Response 3 is less meaningful than Responses 1 and 2. Therefore, input text messages associated with the sequence of Response 3+Response 1, may be modified to only be associated with Response 1. Similarly, input text messages associated with the sequence Response 3+Response 2, may be modified to only be associated with Response 2. An embodiment includes having different priorities among the different responses, and choosing or selecting to only associate using the highest priority response in a sequence.

Although specific embodiments have been described and illustrated, the embodiments are not to be limited to the specific forms or arrangements of parts so described and illustrated. The described embodiments are to only be limited by the claims.

What is claimed:

1. A method, comprising:
   receiving, by a server, a first input text message from a user;
   displaying, by the server, the first input text message to an agent;
   receiving, by the server, a first response to the first input text message from the agent;
   computing a first intent with the first input text message;
   prompting, by the server, the agent whether to associate the first response with the computed first intent of the first input text message;
   recording the first response with the computed first intent of the first input message when the agent indicates an association between the first response with the computed first intent of the first input message;
   receiving, by the server, a second input text message from one or more users;
   computing the first intent with the second input text message;
   identifying the first response for the second input message based on the recorded association between the first response and the computed first intent;
   facilitating, by the server, automatically sending the first response to the one or more users in response to the second input text message based on the identifying the first response for the second input message;
   receiving, by the server, editing of the first input text message of the first response by the agent;
   selecting a change threshold of the edited first input text message of the first response, wherein selecting the change threshold of the edited message of the first response is based on a type of conversation classification of the agent, wherein the type of classification includes at least a customer service type or a sale type;
   checking, by the server, whether the edited first input text message of the first response has changed greater than the change threshold, comprising checking an edit distance between the message of the first response and the edited message of the first response; and
   maintaining the associating and recording of the edited first input text message of the first response with the first input text message when the edited first input text message of the first response has changed less than the change threshold.

2. The method of claim 1, wherein receiving the first response to the first input text message from the agent, comprises:
   displaying, by the server, a configurable menu of responses to the first input text message to the agent; and
   receiving, by the server, the first response as a selection of one of the configurable menu of responses from the agent.

3. The method of claim 2, further comprising:
   facilitating, by the server, sending of the first response to the user in response to the first input text message.

4. The method of claim 1, further comprising:

displaying, by the server, a configurable menu of responses to the second input text message to the agent, wherein the configurable menu of responses includes at least the first response;

receiving, by the server, the first response as a selection of one of the configurable menu of responses from the agent.

5. The method of claim 1, further comprising:

correlating actions of each of the one or more users with receipt of the first response based on timing between the receipt of the first response and the actions of each of the one or more users.

6. The method of claim 1, further comprising:

receiving, by the server, a second response to the second input text message from the agent;

computing a second intent with the second input text message;

prompting, by the server, the agent whether to associate the second response with the computed second intent of the second input text message; and recording the second response with the computed second intent of the second input message when the agent indicates an association between the second response with the computed second intent of the second input message.

7. The method of claim 1, wherein associating the first response with the computed first intent comprises assigning an ID to the first response.

8. The method of claim 7, wherein the ID of the first response includes additional semantic meaning which is displayed to the agent providing the agent with information regarding the first intent of the first response associated with the at least one ID.

9. The method of claim 7, further comprising generating a plurality of annotated datasets based on associating each of the first input text message and a second input text message with the first response having the assigned ID.

10. The method of claim 7, wherein the assign ID of the response includes additional semantic meaning which is displayed to the agent providing the agent with information regarding the first intent of the first response associated with the at least one ID.

11. The method of claim 1, further comprising grouping a plurality of input text message presented to the agent based on categories of intents associated with the plurality of input text messages.

12. The method of claim 1, further comprising:

receiving, by a server, multiple input text messages from the user;

displaying, by the server, one or more of the multiple input text messages to the agent;

receiving, by the server, a second response to the one or more of the multiple input text messages from the agent;

computing a second intent with the one or more of the multiple input text messages;

prompting, by the server, the agent whether to associate the second response with the computed second intent of the one or more of the multiple input text messages; and recording the second response with the computed second intent of the one or more of the multiple input text messages when the agent indicates an association between the second response with the computed second intent of the one or more of the multiple input text messages.

13. The method of claim 1, further comprising:

receiving, by the server, N responses to the first input text message from the agent;

adaptively selecting a selected response to the first input text message based on a timing in which each of the N responses are received from the agent;

prompting, by the server, the agent whether to associate the selected response with the computed first intent of the first input text message; and recording the first response with the computed first intent of the first input message when the agent indicates an association between the first response with the computed first intent of the first input message.

14. The method of claim 1, further comprising:

downloading an application to computing devices of the one or more users;

triggering the downloaded application to monitor actions sensed by sensors of the computing devices of each of the one or more users when each of the one or more users receives the first response;

determining a ranking of quality of the first response comprising monitoring, by the downloaded application, actions sensed by the sensors of the computing devices of the one or more users based on receiving the first response; and determining whether to continue to automatically send responses by identifying responses based on recorded associations between past responses and previously computed intents, or to receive responses from the agent for future input text messages, based on the ranking of the first response determined by the actions sensed by the sensors of the computing devices of the one or more users.

15. The method of claim 14, wherein evaluating the quality further includes determining whether the actions of the user monitored by the downloaded application include the user purchasing a product or service of the agent as a result of having received the first response.

16. The method of claim 14, wherein the first response includes an indicator that the downloaded application identifies as an indication to start monitoring actions sensed by sensors of the computing devices.

17. The method of claim 14, wherein the actions monitored by the downloaded application include the sensors of the computing devices of each user monitoring physical locations of the computing devices of the one or more users to determine whether the one or more users visits a physical location of the agent, wherein the sensors include accelerometers, gyroscopes, and magnetic sensors.

18. The method of claim 14, wherein the actions monitored by the downloaded application include the sensors of the computing devices of each user monitoring physical locations of the computing devices of the one or more users to establish relationships between different users, and sensing physical interactions by related users to determine whether the sensed interaction are caused by the first response.

19. A system for implicitly associating user intents to agent selected responses, comprising:

a merchant server configured to operate and manage a website;

a plurality of customer devices configured to provide input text messages; and a server electronically connected to the merchant server and the plurality of customer devices, the server configured to:

receive a first input text message from a user;

display the first input text message to an agent;

receive a first response to the first input text message from the agent;

compute a first intent with the first input text message;

prompt the agent whether to associate the first response with the computed first intent of the first input text message;

record the first response with the computed first intent of the first input message when the agent indicates an association between the first response with the computed first intent of the first input message;

receive a second input text message from one or more users;

compute the first intent with the second input text message;

identify the first response for the second input message based on the recorded association between the first response and the computed first intent;

facilitate automatically sending the first response to the one or more users in response to the second input text message based on the identifying the first response for the second input message;

receive editing of the first input text message of the first response by the agent;

select a change threshold of the edited first input text message of the first response, wherein selecting the change threshold of the edited message of the first response is based on a type of conversation classification of the agent, wherein the type of classification includes at least a customer service type or a sale type;

check whether the edited first input text message of the first response has changed greater than the change threshold, comprising checking an edit distance between the message of the first response and the edited message of the first response; and maintain the associating and recording of the edited first input text message of the first response with the first input text message when the edited first input text message of the first response has changed less than the change threshold.

\* \* \* \* \*